United States Patent
Cofler et al.

(10) Patent No.: US 10,583,645 B2
(45) Date of Patent: Mar. 10, 2020

(54) SYSTEM AND METHOD FOR PRINTING THREE-DIMENSIONAL OBJECTS

(71) Applicant: VELOX-PUREDIGITAL LTD., Rosh Haiin (IL)

(72) Inventors: Marian Cofler, Kfar Yona (IL); Avi Feinschmidt, Holon (IL); Adrian Cofler, Gan Yavne (IL)

(73) Assignee: VELOX-PUREDIGITAL LTD., Rosh Haiin (IL)

( * ) Notice: Subject to any disclaimer, the term of this patent is extended or adjusted under 35 U.S.C. 154(b) by 305 days.

(21) Appl. No.: 15/311,958

(22) PCT Filed: May 20, 2014

(86) PCT No.: PCT/IB2014/061569
§ 371 (c)(1),
(2) Date: Nov. 17, 2016

(87) PCT Pub. No.: WO2015/177598
PCT Pub. Date: Nov. 26, 2015

(65) Prior Publication Data
US 2017/0100898 A1    Apr. 13, 2017

(51) Int. Cl.
*B29C 64/112* (2017.01)
*B33Y 50/02* (2015.01)
(Continued)

(52) U.S. Cl.
CPC .......... *B33Y 50/02* (2014.12); *B29C 64/112* (2017.08); *B29C 64/386* (2017.08); *B29C 64/40* (2017.08);
(Continued)

(58) Field of Classification Search
None
See application file for complete search history.

(56) References Cited

U.S. PATENT DOCUMENTS 3,933,091 A    1/1976   Von Saspe
7,988,256 B2 *  8/2011   Burmeister .......... B41J 2/16517
                                                    347/22
(Continued)

FOREIGN PATENT DOCUMENTS

CN    103660605    3/2014
GB    2379414 A    3/2003
(Continued)

OTHER PUBLICATIONS

International Search Report for International Application No. PCT/IB2014/061569 dated Aug. 25, 2014.

*Primary Examiner* — Monica A Huson
*Assistant Examiner* — Kelsey C Grace
(74) *Attorney, Agent, or Firm* — Dorsey & Whitney LLP

(57) ABSTRACT

A layer-by-layer three dimensional printing technique for printing on outer surfaces of a plurality of substrate elements passing through a printing route/zone while being rotated thereinside about a printing axis. At least one array of printing head units is used to define at least one printing route along the printing axis, where the at least one printing route is a substantially linear segment of a closed loop lane along which the objects are progressing. The print head units being configured for movement along radial axes, or one or more axes substantially perpendicular, to the printing axis, to allow layer-by-layer printing of said three-dimensional objects over said substrate elements while being rotated in said printing route.

18 Claims, 20 Drawing Sheets

(51) Int. Cl.
  *B33Y 10/00* (2015.01)
  *B33Y 30/00* (2015.01)
  *B29C 64/40* (2017.01)
  *B29C 64/386* (2017.01)
  *B33Y 40/00* (2020.01)

(52) U.S. Cl.
  CPC .............. *B33Y 10/00* (2014.12); *B33Y 30/00* (2014.12); *B33Y 40/00* (2014.12)

(56) References Cited

U.S. PATENT DOCUMENTS

| | | | |
|---|---|---|---|
| 8,931,883 B2 * | 1/2015 | Shiiya | B41J 23/12 347/32 |
| 2002/0044168 A1 | 4/2002 | Hashi et al. | |
| 2004/0080563 A1 * | 4/2004 | Leemhuis | B41J 2/16511 347/22 |
| 2004/0141018 A1 | 7/2004 | Silverbrook | |
| 2008/0192104 A1 | 8/2008 | Nye et al. | |
| 2009/0213157 A1 | 8/2009 | Obertegger et al. | |
| 2009/0284566 A1 * | 11/2009 | Suzuki | B41J 2/16588 347/38 |
| 2010/0295885 A1 | 11/2010 | LaCaze | |
| 2012/0147092 A1 | 6/2012 | Achatz et al. | |

FOREIGN PATENT DOCUMENTS

| | | |
|---|---|---|
| JP | 2001191610 | 7/2001 |
| WO | 2008077850 A2 | 7/2008 |
| WO | 2014076704 A1 | 5/2014 |

\* cited by examiner

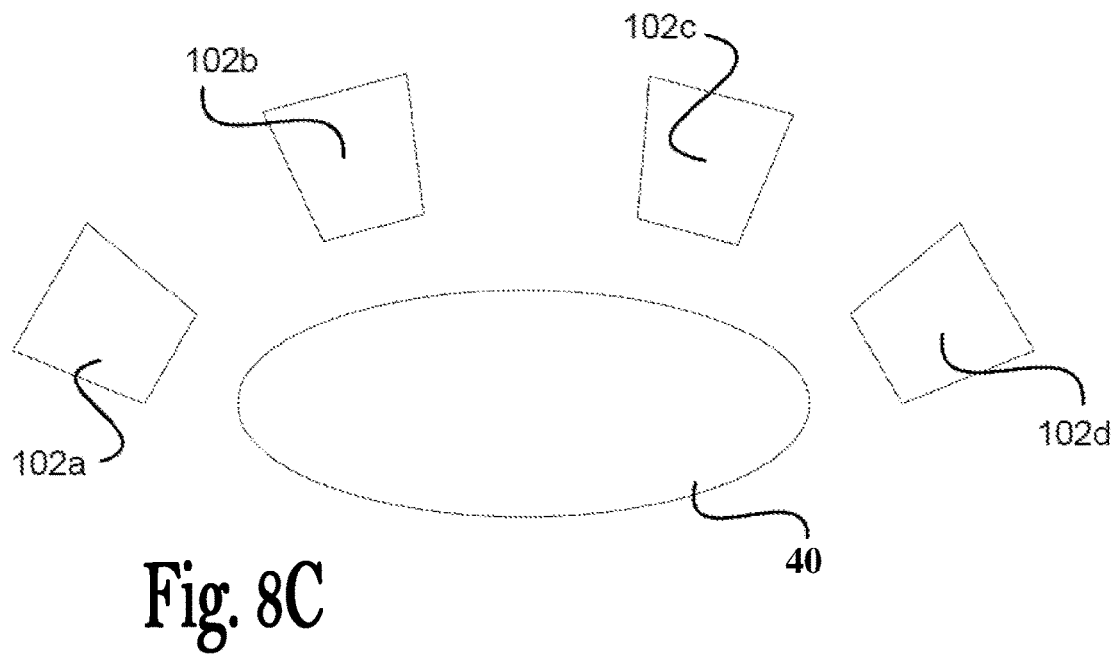
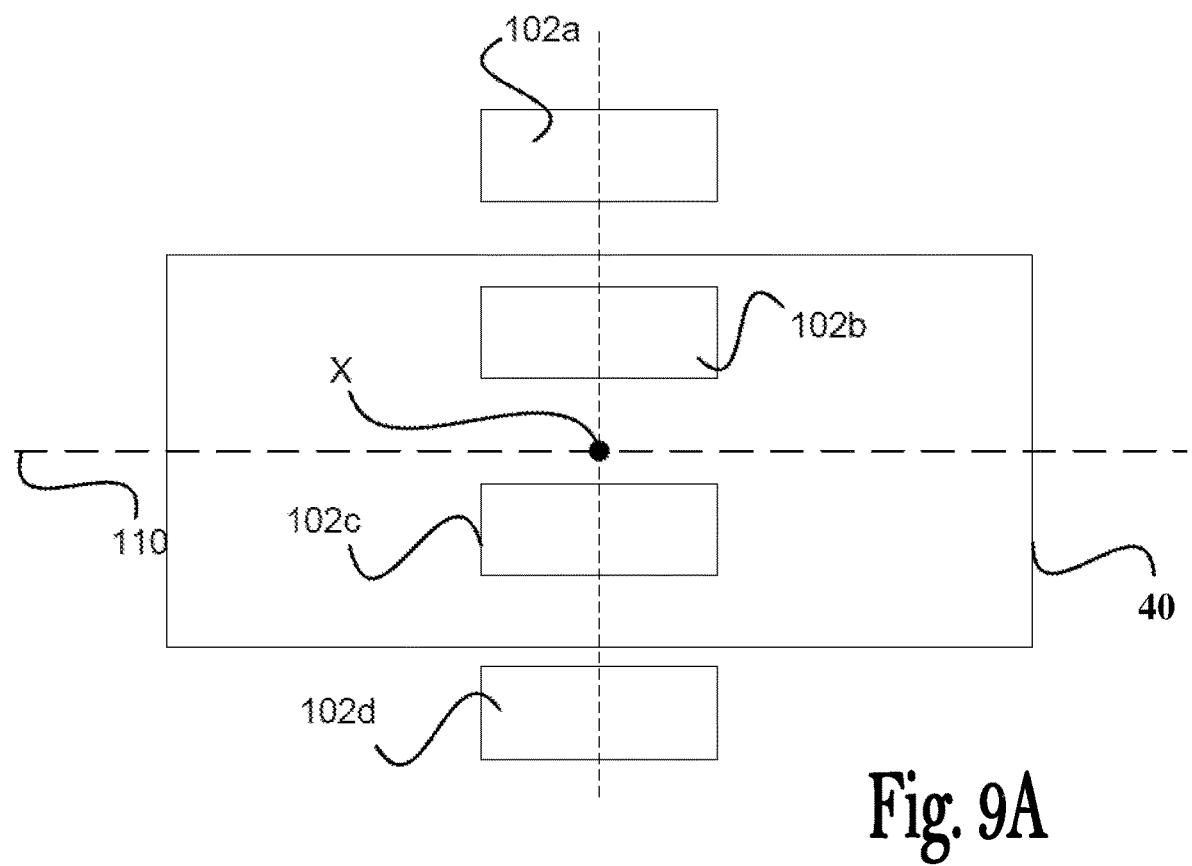

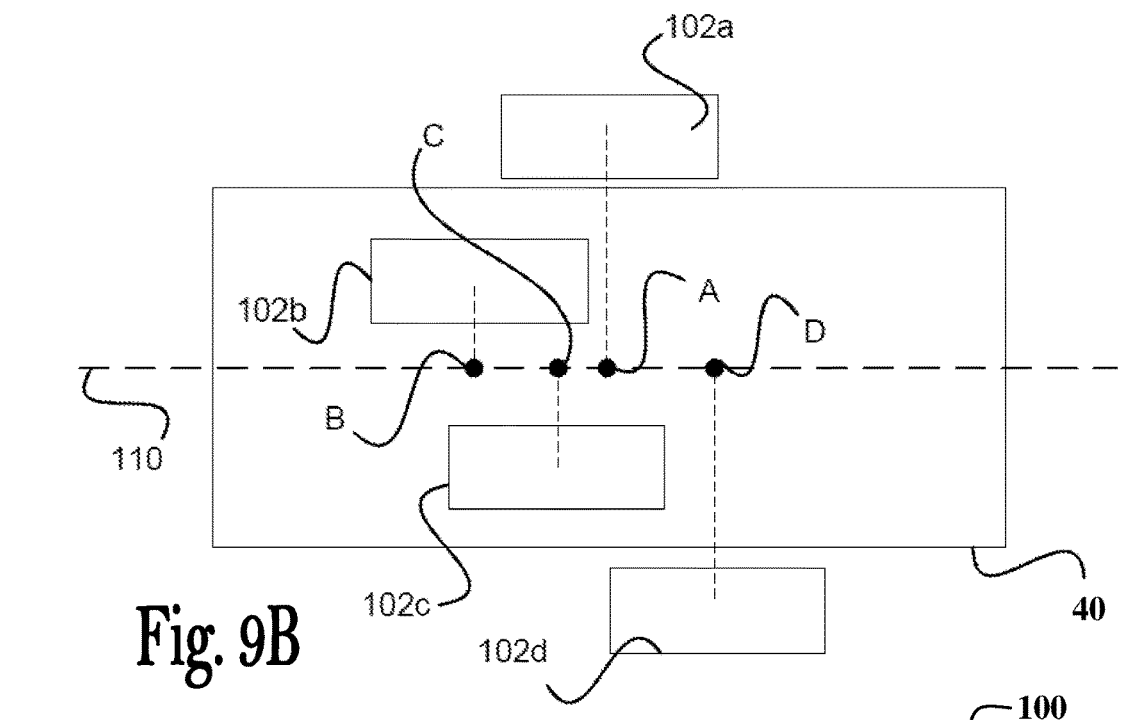
Fig. 9B
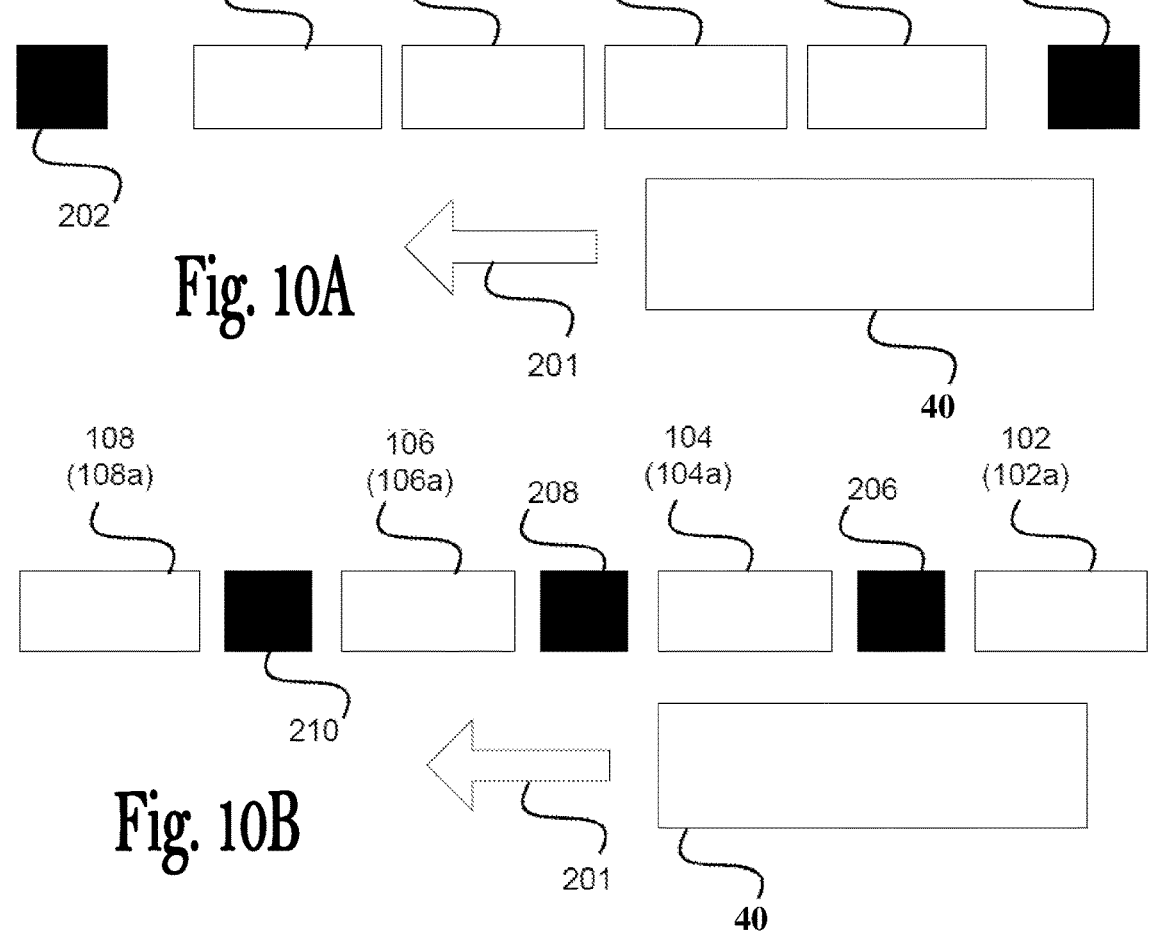
Fig. 10A
Fig. 10B

SYSTEM AND METHOD FOR PRINTING THREE-DIMENSIONAL OBJECTS

TECHNOLOGICAL FIELD

The invention is generally in the field of printing of three-dimensional objects.

BACKGROUND

Three-dimensional (3D) printers are device that print three-dimensional objects (e.g., tools, accessories, game pieces, spare parts, and objects suchlike). In 3D printing, sometimes referred to as direct digital manufacturing (DDM) or additive manufacturing (AM), a 3D object is created using a digital file (also referred to as 3D model) usually generated by means of computer-aided design (CAD) software. Typically, the 3D model of the object to be printed is sliced into a plurality of two-dimensional representations which are sequentially transmitted to the 3D printer, wherein the objects is printed layer by layer starting from a predefined base thereof. In this additive layer by layer build process, each layer is deposited on, and fused to, a previous layer, thereby allowing production of complex structures with minimized waste.

For example, in 3D inkjet powder printing techniques printing materials are selectively fused layer-by-layer, one on top of the other, by moving the working area downwardly, or by moving the printing upwardly, after completing each layer, until the desired 3D object is produced.

GENERAL DESCRIPTION 3D printers are typically based on an additive layer-by-layer build process which could be found in few technologies such as Stereo lithography SLA, Laser Sintering SLS, Direct Metal Printing (DMP) (described by 3dsystems), plastic nozzle FMA (described in Startasys systems, Inkjet printing and immediate curing as described in Objet/Stratasys). Typically, in these methods printing of an object can be a heavy time consuming task (although considered rapid in house prototyping). For example, such tasks might need hours for printing a cubic centimeter object ($cm^3$ sized/volume unit) and could reach days or week for printing of a cubic meter object ($meter^3$ sized/volume units), depending on the size and the resolution of the printing/forming that creates the fine tuning and number of colors required for printing or functional material combined to create the final object/s within the volumetric 3D shape.

The existing conventional 3D printing techniques suffer from low efficiency, resolution, and throughput, mainly because these techniques utilize layer-by-layer printing on a planar surface using nozzles arranged in a plane with respect to an object plane, and require a scanning procedure during which some of the printing heads are not in use when the other are involved in printing.

As a result, the existing technologies are practically not suitable for industrial production of objects progressing on a production line.

There is accordingly a need in the art for a novel approach for 3D printing techniques allowing fast printing, preferably also for of a plurality of 3D objects, by enabling maximal utilization (high efficiency close to 100%) of the printing heads. It is also required that such 3D printing techniques retain a relatively high printing resolution, with very high system accuracies (microns), which makes 3D inkjet printing technology very challenging for real production line use. Therefore, maintaining a high efficiency level by maximizing the printing engine utilization is necessary in such techniques to perform production runs.

The present invention provides a fast 3D printing process that can be used for simultaneously printing a plurality of 3D objects using a print head assembly which includes a plurality of print head units, where the print head units are arranged in a corresponding plurality of different (e.g., spaced-apart or seamless) locations along an axis of a relative displacement between the printing heads and the object (e.g. translation of the object). In particular, in some embodiments, the 3D printing process is carried out by successively depositing layers of printing/forming materials over a rotating substrate (e.g., starting from a substrate of a small-size cross sectional dimension, e.g. diameter, such as a thin elongated cylindrical polymer), and the print head units are adapted to move along radial axes, or one or more axes substantially perpendicular to a printing axis, to allow layer-by-layer printing of the three-dimensional objects over the substrate during a relative displacement between the print head units and the substrate, e.g. while the substrate is rotated. In these embodiments, the printing is done in highest efficiency, hence the system is printing/forming while increasing the printed layer on each revolution of the object leading to an efficient object building, 100% of time is dedicated to printing/forming the object.

The printing materials used in the 3D printing process may comprise fusible materials (i.e., capable of being fused to a previous layer, or to the substrate) which become part of the 3D object structure, and non-fusible materials (i.e., that cannot fuse to a previous layer, or to the substrate) used to fill gaps and cavities of the 3D objects and provide support for the successive layers to be deposited thereover. The non-fusible printing materials are designed for removal from the final product, for example, by washing, dissolving, evaporating, cleaning, or melting, them. The fusible printing materials may comprise, but not limited to, all acrylic monomer/oligomer known today such as used in regular printing UV inks, and the non-fusible printing materials may comprise, but not limited to, acrylic monomers and oligomers with functional fee carbixilic group that will dissolve in basic PH>10 aqueous solutions, additional example is used in photoresist that will dissolve in sodium hydroxide solutions.

In some embodiments the substrates on which the layers of printing materials are deposited is made from a type of non-fusible material that can be removed from the printed object during the removal of the non-fusible printing material. For example, and without being limited, when using such substrate made of fusible or non-fusible material the 3D printing process may be initiated by printing a layer of non-fusible printing material over the surface of the substrate, and thereafter printing layers composed of fusible printing materials and/or non-fusible printing materials, as needed to construct the 3D object.

Accordingly, in some embodiments, each printed layer in the 3D printing technique of the present invention is substantially cylindrical in shape, and the final printed product/s, which may be substantially cylindrical in shape in some, or all, sections thereof, and might in some cases undergo an extraction process/stage for removal of the non-fusible printing materials to obtain the desired 3D object.

It should be noted that although the substrate on which the object is printed is generally cylindrical or tubular, and the final object/s, formed layer-by-layer on such a substrate during the substrate revolution and possibly also linear translation, may not be of a cylindrical shape. Each revolution could be considered a layer or all revolutions could be considered one continuous layer without the end and start on each revolution. Each cylindrical layer could be obtained by combining one or more relevant fusion and non-fusion materials. Each cylindrical layer might be flattened, if needed, by any existing flattening mechanism such as air knife or physical pressure applied roller.

The printing system may be associated with a real-time inspection/control system that will prevent cancellation of the object at end of process.

It should also be noted that the printing system may be associated with an array of drying, curing, fixing, cooling and other units, which may be placed in any position such that will apply the respective processes at each revolution of the object being printed. In some embodiments, the printing ink has a self-fixating or a full curing/drying mechanism thereby eliminating or at least significantly reducing the requirement for UV curing units, such that the UV curing applied once for one or more of the revolutions.

In some embodiments, closed loop support assembly on which the objects are built are used that move the objects in a continues closed loop creating many passages by having different bridges crossed, such as fused bridge and following the non-fusing bridge and others, while repeating continuously until the object is built (e.g. non cylindrical).

In some applications, a closed loop lane (e.g., planar lane, being substantially parallel to ground plane) is used in the printing system for printing of at least one stream of 3D objects in a production line, and move the stream of 3D objects over the lane through one or more stages of the printing process. A printing zone is defined along a section of the closed loop lane wherein a printing assembly is operatively installed for layer-by-layer 3D printing on a rotating substrate traversing the printing zone by at least one array of print head units of the print head assembly.

The at least one array of print head units is preferably configured to define at least one printing route along a printing axis for advancing a stream of rotating substrates therealong while successively printing over their external surfaces layers of printing materials by the print head units of the assembly. The print head assembly may comprise several arrays of print head units, each configured to define at least one printing route along the printing axis and which may be used for passing additional streams of substrates (objects being printed) therealong. For example, and without being limiting, each print head array may comprise one or more aligned columns of print head units, wherein the print head units in each column have a predefined slant defining a specific orientation of each column of print head units to thereby direct their printing elements (e.g., printing nozzles for ejecting fusible and non-fusible material compositions) towards a specific printing path covered by the array.

The lane may comprise a conveyor system configured to convey the stream of substrates along the lane and pass them and the layered structures printed on them through one or more zones of the lane adapted for carrying out various functionalities of the system. One or more support platforms (also referred to herein as carriages) may be used in the conveyor system to translate the stream of objects being printed on substantially cylindrically-shaped substrates, and any layered structures which may be printed on them, over the lane. In some embodiments each support platform is configured to be loaded with at least one stream of substrates from the production line and slide the substrates over the lane through its one or more zones for processing and treatment. The support platform may be configured to maintain a stream of substrates loaded thereto and aligned with respect to one or more printing routes defined by the print head assembly, and controllably rotate the substrates carried by the platform whenever passing through certain zones of the lane or are standing constant and/or jumping from one to other groups of print heads while rotating in this area until completion of the object (e.g., the printing zone).

The lane may include loading and unloading zones configured to receive one or more such streams of substrates, and for removing the substrates, and any layered structures which may be printed on them, therefrom after completing the printing (typically requiring a single loop travel over the lane). A priming zone may be also defined on a section of the lane, and in some embodiments might be in the same line with fusion and non fusion print heads, wherein the surface areas of the substrates may undergo a pre-treatment process designed to prepare the surface areas of the substrates for the printing process or create reaction to fixate or solidify the fusion and non fusion materials. The lane may further comprise a curing zone, wherein the substrates and the layered structures printed on them, exiting the printing zone undergo a curing process (e.g., ultra violet—UV) to cure material compositions applied to their external surfaces.

In some embodiments, projections of the print head units on the axis of translations fall on different portions of the axis of translation. In this setup, the conveyor system affects a relative motion between the substrates, and any layered structures which may be printed on them, and the print head units. The relative motion provides both (i) a rotational motion around the axis of translation for bringing desired regions of the substrates surface, or of layered structures printed on the substrates, to the vicinity of the desired print head units and (ii) a translational motion along the axis of translation needed for bringing the substrate, and any layered structure which may be printed on it, from one print head units to a successive print head unit. This enables two or more print head units to print on the same rotating substrate simultaneously. Furthermore, it allows one or more print sessions on the same path, increasing (at least twice) the printing speed and layer buildup. In the technique of the present application, the substrates may be printed upon while being in a static position under a group of print heads, or the substrates are moved between groups of print head units according to the need of the specific object (the groups might be for printing of the same material, different colors, flexible or/and strength materials or even conducting materials). In this manner, the 3D printing process is accelerated, and high 3D printing throughput can be achieved. Additionally, the configuration of the 3D printing system simultaneously prints on more than one substrate at the same time, by exposing consecutive substrates to the arrays of print head units. It is further noted that the array of print head units is suitable for printing also on long substrates at a variety of diameters.

The 3D printing may be performed continuously (continuous printing) or in discrete steps (step printing). If the printing is continuous, the relative motion between substrate and print head units might include the substrate rotation around the axis of translation under a fixed group of nozzles that are arranged and operated according to the required resolution, or concurrent linear translation of the substrates along the axis of translation and rotation around the axis of translation. In this manner printing of the printing materials occurs along a substantially spiral path. It might be the case that once the spiral path has finished, the object continues on the closed loop lane to repass the spiral path. In some other embodiments, it might be that the substrate/object reaches the end of the spiral path and returns to the beginning thereof in a continuous movement along the axis of translation, while moving with different velocities. If the printing occurs in discrete steps, a relative translation between the substrate and the print heads brings desired regions of the substrate, and any layered structures which may be printed on it, in the vicinity of one or more groups. The translation is stopped, and a relative rotation is effected, in order to enable circumferential printing of the substrate. After printing of each layer the print heads are retracted (e.g., radially) by a predefined amount to permit successively printing a new layer thereover.

It should be understood that such different-velocities movement can be used with respect to the UV curing stage, as well as any other processing of the object, e.g. image inspection system, required/used in the object formation process.

In some embodiments the print head assembly includes a plurality of groups of printing heads. Each group includes at least two print head units arranged in different locations along a curved path around said axis of translation and surrounding a respective region of the axis of translation.

Therefore, an aspect of some embodiments of the present application relates to a 3D printing system configured for printing on an outer curved surface of a substrate. The system comprises a support/conveyor system and a print head assembly. The conveyor system is configured for effecting a relative translation between the substrate and the print head assembly with respect to an axis of translation, which may include a relative rotation between the substrate and the print head assembly around the axis of translation (e.g. by rotating the substrate only), and possibly also a linear movement of the substrate along the translation axis.

The print head assembly comprises a plurality of print head units, arranged such that projections of different print head units on the axis of translations fall on different portions of the axis of translation, each of the print head units having at least one nozzle and/or ejection aperture (also referred to herein as printing element) for ejecting a material composition (e.g., fusible or non-fusible, generally related to herein as printing materials) onto the substrate's surface, or onto previously printed layers.

In a variant, the print head assembly further comprises additional print head units, such that the print head units are arranged in a plurality of groups, at least one group comprising at least two of the print head units arranged along a curved path around the axis of translation, and each group surrounding a respective region of the axis of translation.

In another variant, the printing system comprises a control unit configured to operate the conveyor system to carry out said translation and/or rotation movements, to provide a relative displacement between the object being printed and the print head units, as well as any other units/systems involved in the object formation, e.g. UV curing, image inspection system. The relative displacements involve movements along radial axes, or one or more axes substantially perpendicular to a printing axis. The control unit may be configured to operate at least some of the print head units according to a predetermined pattern, to thereby enable layer-by layer printing of the three-dimensional objects over the substrate.

The control unit may be configured to operate the conveyor system and at least some of the print head units, so as to effect simultaneous printing of fusible and/or non-fusible printing material layers on the substrate's surface, and/or over previously printed layers, by one or more of the following: at least two print head units, each belonging to a respective one of the groups; different printing elements of a single one of the print head units; and at least two print head units belonging to a single one of the groups.

In a variant, the conveyor system is configured for moving the substrates, and any layered structures which may be printed on them, along the axis of translation. In another variant, the conveyor system is configured for moving the print head assembly along the axis of translation. In yet another variant, the conveyor system is configured for rotating the substrate around the axis of translation. In a further variant, the conveyor system is configured for rotating the print head assembly around the axis of translation.

In some embodiments the control unit is configured to operate the conveyor system to carry out the translation in a step-like fashion and to carry out the rotation at least during a time interval in which translation does not occur, and to operate at least some of the print head units to carry out the 3D printing during the time interval in which translation does not occur and rotation occurs.

In some embodiments the control unit is configured for operating the conveyor system to carry out the translation and rotation simultaneously while operating at least some of the print head units to effect printing, such that continuous 3D printing of fusible and/or non-fusible printing materials is performed on the substrate's surface, and/or on layered structures which may be printed on it, along at least one substantially spiral path.

In some embodiments, the substrate/object rotation speed might be lowered as the cross-sectional dimension of the objects increases as a result of printing successive layers, and the surface movement relative to the print-heads nozzles gets above the maximal speed allowed to maintain a certain frequency of jetting.

In a variant, the conveyor system is further configured for effecting a relative motion between the substrate and the print head assembly (and other units, e.g. UV curing, inspections system, flattening/wiping roll, etc.) along one or more radial axes substantially perpendicular to the axis of translation, in order to maintain a desired distance between at least one print head unit and the substrate's surface, and/or any layered structures which may be printed on it, while said at least one print head unit prints data thereon.

In a variant, the conveyor system is configured for displacing at least one of the print head units to move towards and away from the translation axis. The displacement could be also for maintenance reasons during the printing while other print heads compensate.

In yet another variant, the conveyor system is configured and operable for displacing said at least one of said print head units with respect to the translation axis before operating the print head assembly to print the printing material.

In a further variant, the conveyor system is configured and operable for displacing said at least one of the print head units with respect to the translation axis during the printing of the printing material.

In yet a further variant, the conveyor system is configured and operable to operate said displacement to adjust a position of said at least one print head unit to conform to a shape of the surface of the substrate, and/or any layered structures which may be printed on it, on which layer of printing materials are to be printed.

In some embodiments of the present invention, the control unit is configured to apply displacement of the at least one print head unit between an inoperative passive position and an operative active position of the at least one print head unit.

In a variant, the print head units of the same group are configured for ejecting a printing material composition of the same type (fusible or non-fusible), or color or any type of material. In another variant, each of the groups of print head units is configured for ejecting a material composition of a different type (fusible or non-fusible), or color.

As indicated above, the printing system may comprise at least one curing unit configured for curing a material composition ejected by any print head unit on the substrate's outer surface, and/or on any layered structures which may be printed on it. The curing unit may be located along the rotation axis and anywhere in the translation axis or post translation axis (i.e. example downstream to the last print heads group).

As also indicated above, the printing system may comprise at least one priming (pre-treatment) unit configured for priming at least one location of the substrate's surface to receive a composition to be ejected by at least one of the print head units. The priming unit may be located anywhere along the translation axis and anywhere on the rotational axis. The printing system may comprise at least a second curing unit located between print head units belonging to the same group. In some embodiments, the printing system comprises at least one object extraction unit operable for removal of the non-fusible materials therefrom and to thereby obtain the desired 3D structure.

In a variant, projections along the translation axis of the print head units of at least one group fall on a single region of the translation axis. In another variant, the print head units of at least one of the groups are staggered, such that projections along the translation axis of at least two of the print head units of the at least one group fall on different regions of the translation axis.

In yet another variant, the print head units staggered along the axis of translation are arranged such that equal gap between nozzles is created between the different groups of nozzles, such that continuous new group is formed, in addition such group might be considered as a long printing head that basically has an unlimited length. In yet another variant, this group is operated to create a single straight printing line over the printed object (this can be done by having a fixed trigger delay of a number of encoder pulses in the rotational axis between the staggered groups of nozzles).

In yet another variant, different print head units are configured for ejecting respective material composition on a region of the substrate's surface, and/or on any layered structures which may be printed on it, such that a combination of the respective compositions on the substrate's surface forms a desired composition.

In a further variant, successive printing elements (e.g., nozzles and/or ejection apertures) of at least one of the print head units are configured for ejecting respective compositions on a region of the substrate's surface, and/or on any layered structures which may be printed on it, such that a combination of the respective compositions forms a desired composition thereon.

Optionally, the combination of the respective compositions comprises at least one of a mixing between the respective compositions and a chemical reaction between the respective compositions.

In one aspect there is provided a system for printing three-dimensional objects, the system comprising a support system operable for supporting one or more substantially cylindrically-shaped substrates and rotating the one or more substrates about a translation axis while within the at least one printing route, and at least one print head assembly spaced apart from the translation axis, the print head assembly comprising an array of print head units configured to define the at least one printing route, the print head units being arranged in a spaced-apart relationship along the at least one printing route and operable for movement with respect to the translation axis, the movement including at least one of a movement along radial axes and movement along one or more axes substantially perpendicular to the translation axis, to allow layer-by-layer printing of a three-dimensional objects over the substrate while being rotated about the translation axis.

The support system (at time referred to as 'conveyor system") may also be configured to provide a linear movement of the one or more substrates along the translation axis.

At least one of the print head units in the array of print head units may be operable for printing a material composition operable for fusing to at least one of surfaces of the substrates elements and surfaces of previously printed layers. Optionally, and in some embodiments preferably, at least one of the print head units is operable for printing a material composition adapted to provide removable contact with at least one of the surfaces of the substrate elements and surfaces of previously printed layers.

In some embodiment the conveyor system comprises a closed loop lane and the at least one printing route being a substantially linear segment of said closed loop lane.

The system may comprise a support platform for supporting the at least one stream of substrate elements respectively, the support platform being mountable on the conveyor system for moving the substrate elements along the general conveying direction passing through the at least one printing route and being configured to effect rotation of the substrate elements about the printing axis while being moved along the printing route.

Optionally, the print head assembly further comprises at least one additional array of the print head units, such that the printing units of the at least one additional print head array are arranged along at least one additional printing route along the printing axis, at least two of the printing units in each one of the at least two arrays being spaced-apart along an axis traverse to the printing axis.

In some embodiments the support platform is configured to support at least one additional stream of objects and to move them on the conveyor system along the general conveying direction passing through said at least one additional printing route. For example, and without being limiting, the print head units of the at least two arrays may be arranged in a common plane such that each array of the print head units define a respective printing route, the conveyor system and the support platform may be configured for simultaneously moving the at least two streams of substrate elements along the at least two printing routes covered by the respective at least two arrays of the printing head units.

The system may comprise a control unit configured to operate: the conveyor system to carry out the translational movement along the general conveying direction and the rotation movement about the printing axis; the movement of the print head units along radial axes, or one or more axes substantially perpendicular, to the printing axis; and at least some of the print head units to concurrently print on at least one of surfaces of the substrate elements and surfaces of previously printed layers, according to three-dimensional models of said objects. For example, and without being limiting, the control unit may be configured to operate the conveyor system to carry out the translational movement along the general conveying direction in a step-like fashion, and to operate the support platform to carry out the rotation at least during a time interval in which translational movement does not occur, and to operate at least some of the print head units to carry out the printing during the time interval in which translation does not occur and rotation occurs.

In some embodiment control unit is configured for operating the conveyor system and the support platform to carry out the translation and rotation movements simultaneously while operating at least some of the print head units to effect printing, such that substantially continuous printing is performed along spiral paths on surfaces of the substrate elements, or on surfaces of previously printed layers, in the stream of substrate elements.

Optionally, and in some embodiments preferably, the control unit is configured to operate the conveyor system and at least some of the print head units, so as to effect simultaneous printing on surfaces of the substrate elements, or on surfaces of previously printed layers, by at least two print head units belonging to different arrays of print head units.

In some applications the control unit is configured to selectively shift one or more of the print head units between an inoperative passive state and an operative active state thereof, and between different operative states thereof.

The control unit may be further configured to generate a signal for synchronizing operation of the printing elements according to angular and linear position of the substrate carried by the support platform along the printing route.

The system may comprise at least one curing unit configured for curing a material composition ejected by the print head assembly on the surfaces of the objects or of previously printed layers, the at least one curing unit being located at a position along said general conveying direction.

The system may comprise at least one priming unit configured for priming at least one location of the surfaces of the substrate elements to receive a composition to be ejected by print head units of said print assembly.

In some embodiments successive printing elements of at least one of the print head units are configured for ejecting respective compositions on a region of surfaces of the substrate elements or of surfaces of previously printed layers, such that a combination of the respective compositions on the forms a desired composition. For example, and without being limiting, the combination of the respective compositions comprises at least one of a mixing between the respective compositions and a chemical reaction between the respective compositions.

In another aspect there in provided a method of layer-by-layer printing of three-dimensional objects on substrate elements, the method comprising: locating one or more substrate within a printing route defined by at least one array of printing head units arranged along a translation axis; receiving three dimensional models of the objects and data indicative of locations of the one or more substrates within the printing route and data indicative of angular orientation of each substrate; determining, based on the three dimensional models and the received data, surface areas of the one or more substrates, or of previously printed layer on said one or more substrate, facing the print head units of the at least one array, and one or more printing patterns to be applied on the surface areas by the respective print head units; rotating said one or more substrates about the translation axis while operating the array of print head units to print the one or more patterns to create a layer and moving the printing head units with respect to the translation axis to affect the layer-by-layer printing of the three-dimensional objects over the substrate.

The method may comprise rotating the substrates passing through the printing route during application of the one or more patterns. The method may further comprise advancing the stream of substrate elements along the at least one printing route during application of the one or more patterns. In addition, a pre-treatment process may be applied to surface areas of the stream substrate elements before passing them through the printing route.

The method may comprise applying a curing process to surface areas of the stream substrate elements, or to surface areas of previously printed layers, before passing them through the printing route.

In some embodiments a virtual signal is generated for synchronizing operation of the printing head units according to angular and linear positions of the substrate elements progressing through the printing route.

The method may further comprise extracting the substrate upon completing the printing of the object.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIGS. 8A to 8C are schematic drawings exemplifying possible embodiments in which the print head units are controllably movable to fit a shape of the substrate, and/or of any layered structures which may be printed on it, before and during rotation thereof;

FIGS. 9A and 9B schematically illustrate print head arrangements according to some embodiments, wherein FIG. 9A exemplifies arrangements wherein the print head units belonging to the same group are positioned at the same location along the axis of translation and FIG. 9B exemplifies arrangements wherein the print head units belonging to the same group are staggered (being positioned at different locations along the axis of translation);

FIG. 10A to 10D schematically illustrate arrangements of the curing/fixing and/or priming/pretreatment stations according to some embodiments, wherein FIG. 10A exemplifies arrangements in which at least one curing/fixing station is located at the end of the print unit assembly, downstream of the last group of print head units and/or in which at least one priming/pretreatment station is located at the beginning of the print unit assembly, upstream from first group of print head units, FIG. 10B exemplifies arrangements in which at least one curing/fixing station and/or priming/pretreatment station is located between two successive groups of print head units, FIG. 10C exemplifies arrangements in which a plurality of curing/fixing and/or priming/pretreatment stations are positioned one after the other along the axis of translation, and FIG. 9D exemplifies arrangements in which at least one curing/fixing and/or priming/pretreatment unit is located between print head units of the same group;

DETAILED DESCRIPTION OF EMBODIMENTS

Figure 1:
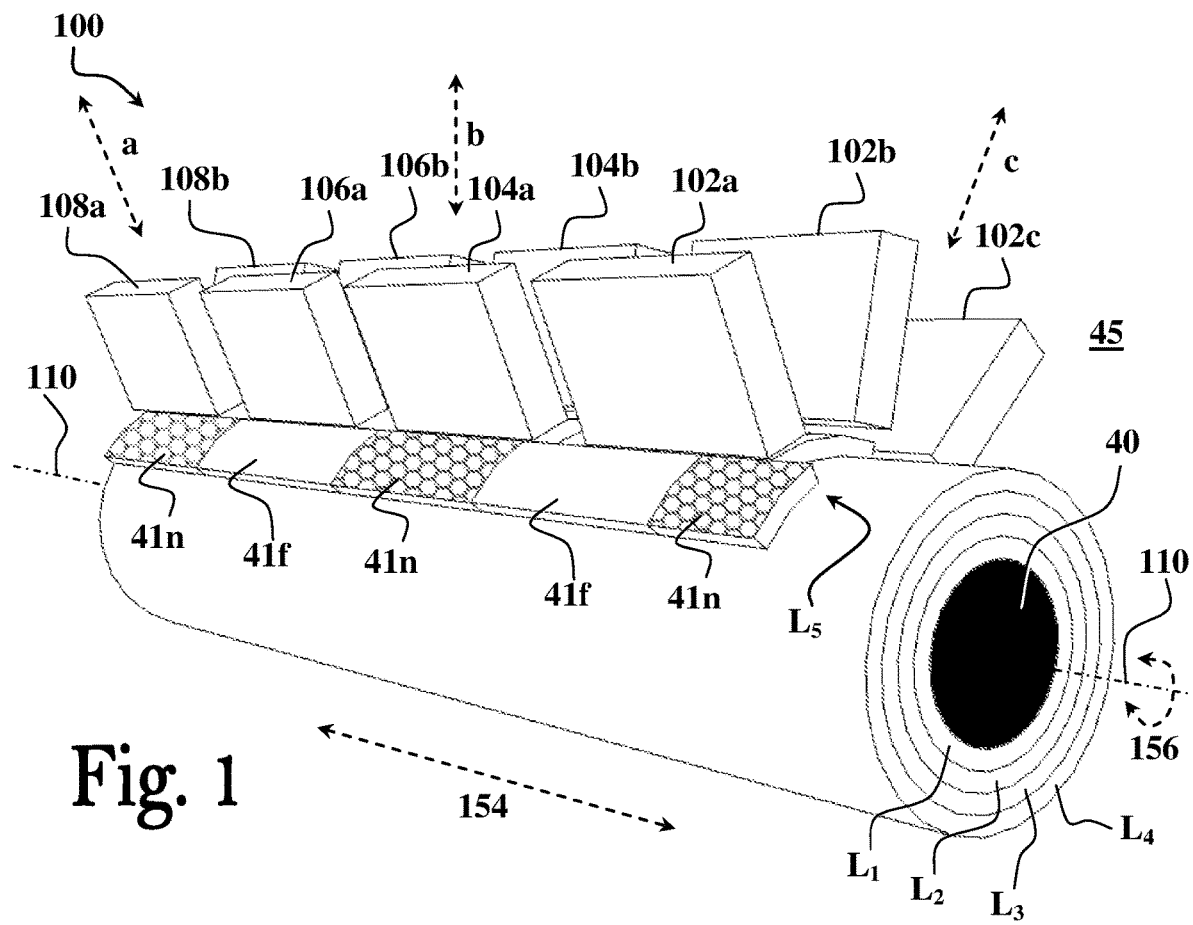
FIG. 1 schematically illustrates an example of a 3D printing system configuration according to some embodiments of the invention.

The various embodiments of the present invention are described below with reference to FIGS. 1 through 22 of the drawings, which are to be considered in all aspects as illustrative only and not restrictive in any manner. Elements illustrated in the drawings are not necessarily to scale, emphasis instead being placed upon clearly illustrating the principles of the invention. This invention may be provided in other specific forms and embodiments without departing from the essential characteristics described herein.

FIG. 1 schematically illustrates a 3D printing arrangement 45 according to some possible embodiments. The 3D printing is carried out in this non-limiting example using a printing head assembly 100 comprising one or more print head arrays, each comprising at least one print head unit capable of ejecting a printing material composition in the direction of the substrate 40. In this non-limiting example, three print head arrays are used, first print head array comprising print head units 102a, 104a, 106a and 108a, second print head array comprising print head units 102b, 104b, 106b and 108b, and third print head array comprising print head units 102c, 104c, 106c and 108c.

The 3D printing arrangement 45 is configured to permit linear movement (indicated by double arrowed dashed line 154) of the substrate 40 along an axis of translation 110, and rotation (indicated by arrowed dashed line 156) of the substrate 40 about the axis of translation 110. The linear (154) and rotary (156) movements of the substrates may be performed simultaneously, or one type of movement at a time, during the 3D printing process.

The printing head units of the printing head assembly 100 are configured to eject and deposit layers $L_1, L_2, L_3, L_4, \ldots$, comprising one or more printing material compositions over the outer surface of the substrate 40. As exemplified in FIG. 1, the 3D printing arrangement 45 is configured to provide a relative displacement between the printing head assembly 100 and the substrate under printing. In some embodiments, the printing head assembly may not rotate and only the substrate/object is rotatable about axis of translation 110. The 3D printing arrangement 45 may be configured to permit movement of the print head units relative to the axis of translation 110 (towards and away from the axis of translation 110) to thereby enable printing of multilayered structures over the external surface of the substrate 40. More particularly, during the printing of each layer $L_i$ (where $i \geq 1$ is a positive integer) the substrate may be moved back and forth along the axis of translation 110 to position sections of the substrate 40 under print units that eject print material composition required at the said sections, and the substrate 40 may be also rotated about the axis of translation 110 to allow complete coverage by printing material compositions of the layer $L_i$. Upon completion of the layer $L_i$ the print head unit are retracted a predefined distance from the substrate 40 to enable deposition of printing material compositions of a new $L_{i+1}$.

In this example, the print head units of each array are shown as being radially movable relative to the axis of translation 110. However, in some embodiments, all print head units printing head assembly 100 may be adapted for up-down movement relative to the substrate 40.

FIG. 1 exemplifies the printing arrangement 45 in the process of printing a new layer $L_5$. In this example, the print head units are adapted for printing of two different types of printing material compositions comprising a fusible material 41f and a non-fusible material 41n. The printing material compositions comprising the fusible materials 41f are designed to fuse (adhere) to a previous layer (or to the substrate) and thereby become part of the 3D object being printed, while the printing material compositions comprising non-fusible materials 41n are designed to reversibly contact a previous layer (or the substrate) to permit removal thereof after completing the 3D printing process (e.g., by washing with water or solvent, by heat melting, by evaporation, peeling off or other methods). Thus, the printing material compositions comprising non-fusible materials 41n are mainly used to fill empty spaces/cavities and, if needed, provide support for the next layers of printing material compositions to be deposited by the printing head assembly 100.

Accordingly, after the 3D printing process is completed, the substrate and the multilayered structure printed thereover undergo an extraction process during which the layer $L_i$ comprising the non-fusible materials 41n are removed, to thereby obtain the desired 3D object structure embodied by the layers comprising the fusible materials 41f which remain fused to each other, and/or to the substrate 40. In some embodiments, the substrate will remain a part of the 3d object, hence a solid object. In such embodiments, the first layer above the substrate will be fusion layer.

FIG. 1 exemplifies a 3D printing process in which the printed multilayered structure of fusible and non-fusible materials is substantially cylindrical in shape. It is however noted that the final multilayered structure (object) obtained after completion of the 3D printing process is not necessarily of a cylindrical shape. For example, in certain cases, the 3D printing objet may include cavities and/or open volumes not covered by successive layers of fusible materials, and thus not requiring filling by non-fusible materials.

Figure 2:
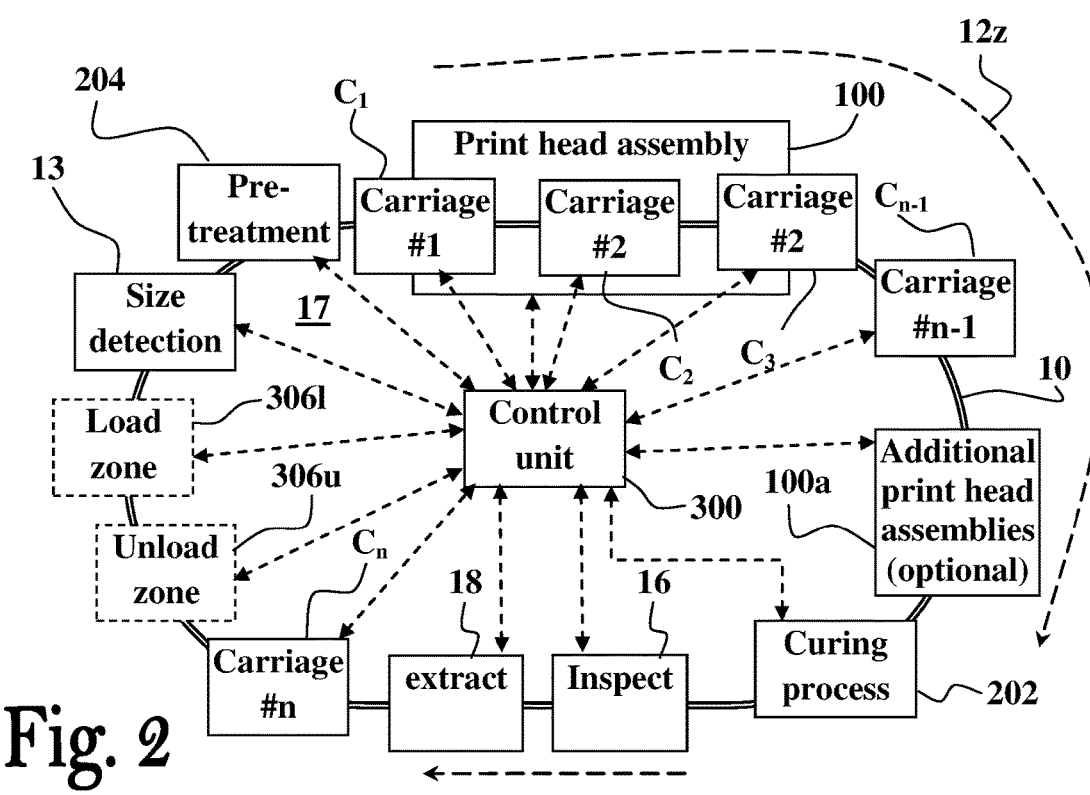
FIG. 2 schematically illustrates the functional components of a 3D printing system according to some embodiments of the invention employing a closed loop lane to translate substrates (objects being printed) therealong.

FIG. 2 schematically illustrates a 3D printing system 17 according to some possible embodiments employing a closed loop lane 10 (e.g., elliptical track) to translate substrates (40), to be printed on (40 in FIG. 2) layered structures ($L_1$, $L_2$, $L_3$, $L_4$, . . . ), towards a printing zone 12z provided in the lane 10 and comprising one or more printing head assemblies 100 (e.g., comprising printing heads of various different compositions). The printing system 17 in this non-limiting example comprises a loading zone 306l configured for automatic loading of a plurality of substrates (40) to be printed on, from a production line. The loading zone 306l may comprise a loading unit employing an independent controller and one or more sensors, motors mechanics and pneumatics elements, and being configured to communicate measured sensor data with a control unit 300 of the printing system 17 for timing, monitoring and managing the loading process. In some embodiments, the loading unit is configured to load a stream of substrates to the system's lane 10.

In some embodiments, the loaded substrates (40) are attached to a plurality of carriages $C_1$, $C_2$, $C_3$, . . . , $C_{n-1}$, $C_n$ (also referred to herein as support platforms or as carriages $C_i$). The attaching to the central axis might be done by coupling to the rotational axis. The carriages are configured for successive movement over the lane 10 and for communicating data with the control unit 300 regarding operational state of the carriages $C_i$ (e.g., speed, position, errors etc.). As described hereinbelow in detail, the carriages $C_i$ may be configured to simultaneously, or intermittently, or in an independently controlled manner, move along the lane 10, and to simultaneously, or intermittently, or in an independently controlled manner, move and rotate the substrates attached to/mounted on them (e.g., using rotors and gears and encoders setup, not shown in FIG. 2), while being treated in a pre-treatment unit 204 (also referred to herein as a priming station) and/or being treated/coated/primed prior, during or after, printing on in the printing zone 12z.

A size detection unit 13 may be used in the lane 10 to determine sizes (geometrical dimensions and shapes) of the substrates received at the loading zone 306l and to communicate size data to the control unit 300. The size data received from the size detection unit 13 is processed and analyzed by the control unit 300 and used by it to adjust positions of print head units of the 3D print head assembly 100 and alert on any possible collision scenarios.

A pre-treatment unit 204 may be also provided in the lane 10 to apply a pre-treatment process to the surfaces of the substrates (40) moved along the lane 10 (e.g., plasma, corona and/or flame treatment to improve adhesion of the ink or material to previous layer create uniformity of the surface or the pervious layer printed). Accordingly, control unit 300 may be configured to adjust operation of the pre-treatment unit 204 according to size data received from the size detection unit 13. As exemplified in FIG. 1 the print head assembly 100 may be configured to accommodate a plurality of carriages $C_i$ (in this example three carriages $C_1$, $C_2$ and $C_3$ are shown) and simultaneously print on surfaces of the substrates attached (40) to each one of the carriages. In other scenario, only one carriage jogging/moving between the different groups of print heads in the print heads assembly is used.

Substrates/objects (40) exiting the printing zone 12z, after being printed on, may be moved along a portion of the lane 10 comprising a curing unit 202, although curing could be also part of each carriage or may be located under the substrate on carriage. The curing unit 202 may be operated by the control unit 300 and configured to finalize each layer being printed or the whole printing process by curing the one or more layers of fusible and/or non-fusible printing material compositions deposited on the substrates (e.g., employing an ultra-violet/UV ink curing process or any other fixing or drying process such as IR, Electronic beam, chemical reaction, and suchlike).

A vision inspection unit 16 may be further used to collect data (e.g., image data) indicative of the patterns (e.g., print registration, diagnostics, missing nozzles, structure completeness) applied to the substrates exiting the printing zone 12z and/or the curing unit 202.

A vision inspection unit 16 may be further used to collect data (e.g., layer printed data) indicative of the patterns (e.g., print registration, diagnostics, missing nozzles, structure completeness) and ensure compensation of the missing data or nozzles or material or color in real-time (next revolution after the printing revolution), such that the printed object will not be obsolete. In such case, the most effective position to apply will be about the axis of rotation in the near to any group of nozzles.

The multilayered printed structures may be then moved to an extraction zone 18 wherein the layers of printing compositions comprising the non-fusible 41n materials are removed, and possibly also the substrates (40), to thereby obtained the desired 3D object structured by the layers of printing material compositions comprising the fusible materials 41f.

After the 3D printing, and optionally performing curing and/or inspection and/or object extraction, the process is completed the printed 3D objects may be advanced over the lane 10 towards an unloading zone 306u for automatic removal thereof from the printing system 17. The unloading zone 306u may include an unloading unit employing an independent controller and one or more sensor units, motors, mechanics and pneumatics elements, and being configured to communicate sensor data with the control unit 300 of the printing system 17 for monitoring and managing the unloading process.

Figure 3A:
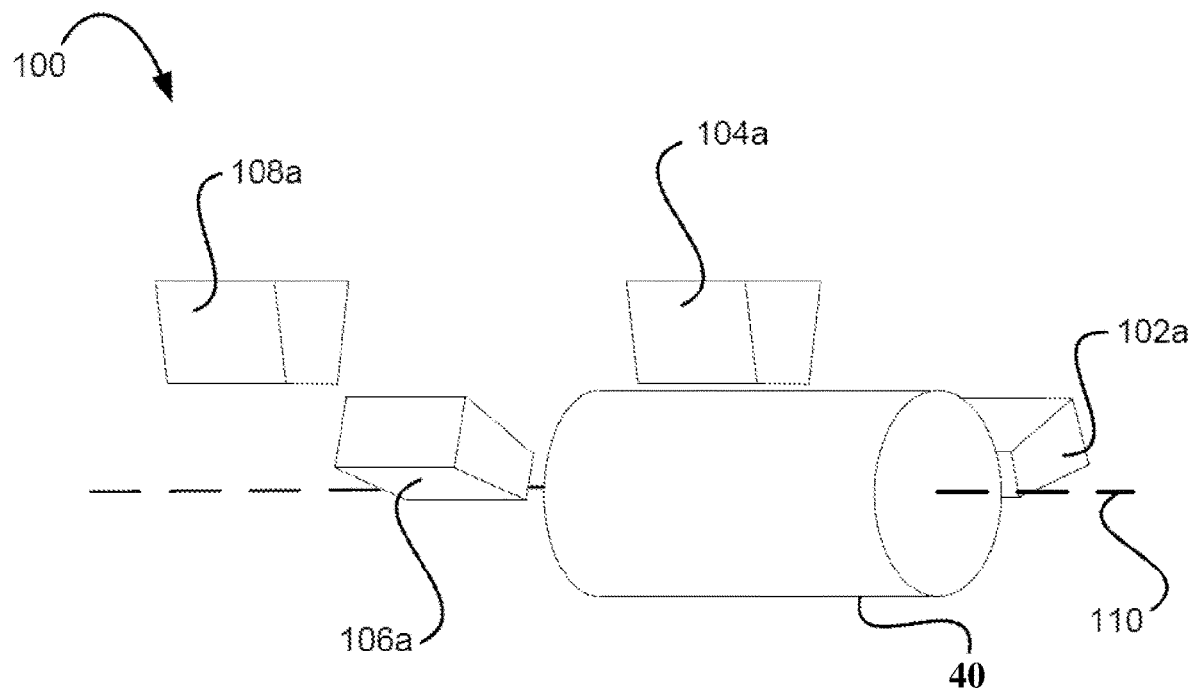
FIGS. 3A and 3B schematically illustrate different examples of a print head assembly according to some embodiments, which include a plurality of print head units located at successive positions along an axis of translation.
Figure 3B:
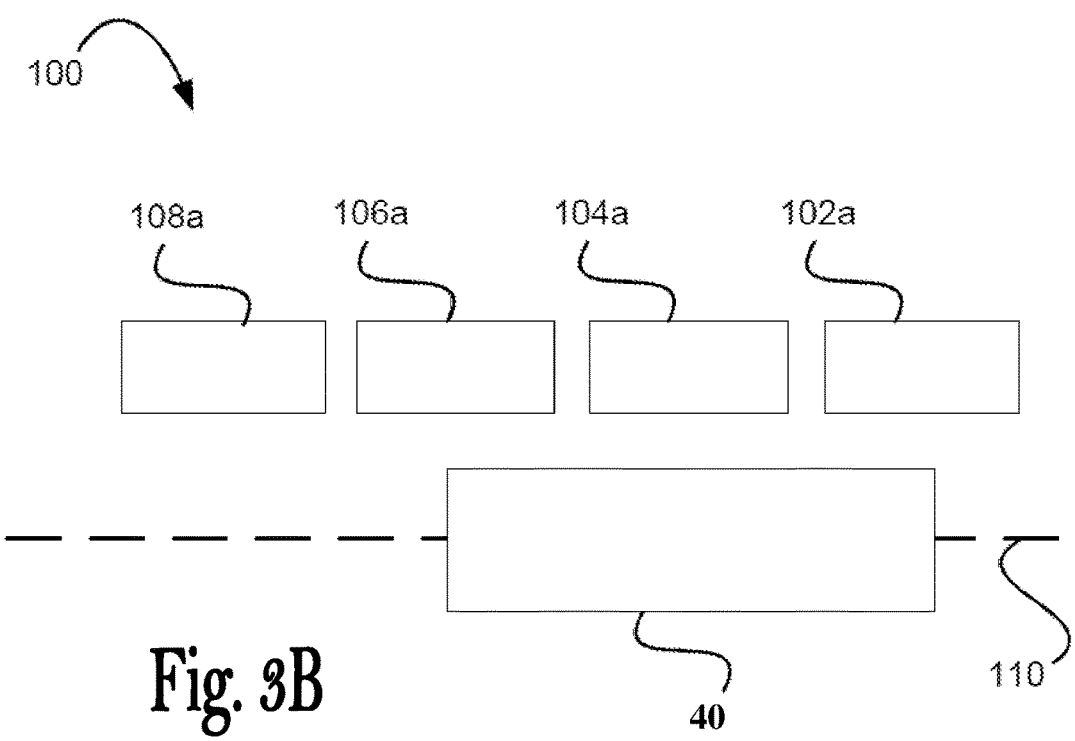

FIGS. 3A and 3B are schematic drawings illustrating different examples of a print head assembly 100 of the present disclosure, which includes a plurality of print head units located at successive positions along an axis of translation 110.

In the example of FIG. 3A, the print head units 102a, 104a, 106a, 108a are arranged such that projections of different print head units on the axis of translation 110 fall on different portions of the axis of translation 110 (along the printing axis), and are set at respective (angular) locations around the axis of translation 100. In the example of FIG. 3B, the print head units 102a, 104a, 106a, 108a are arranged such that projections of different print head units on the axis of translations 110 fall on different portions of the axis of translation 110, and are positioned at the same (angular) locations around the axis of translation 110, to form a line of print head units substantially parallel to the axis of translation 110.

In this non-limiting example the axis of translation 110 generally corresponds to an axis of the substrate 40, and it is the axis along which a respective translation between the substrate 40 and the print head assembly 100 may occur. Moreover, a relative rotation between the substrate 40 and the print head assembly 100 may occur around the axis of translation 100. The details of the translational and rotational motions will be discussed later hereinbelow.

Figure 4A:
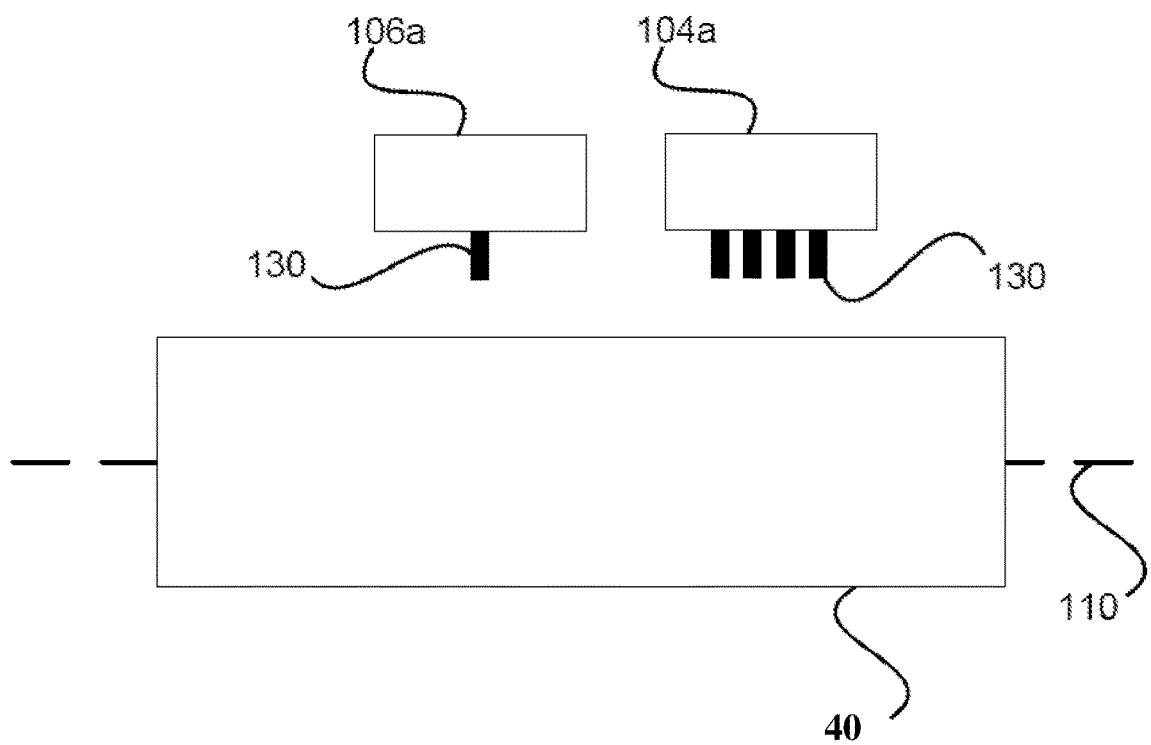
FIGS. 4A and 4B schematically illustrate possible arrangements of printing elements on single print head units, according to some possible embodiments.
Figure 4B:
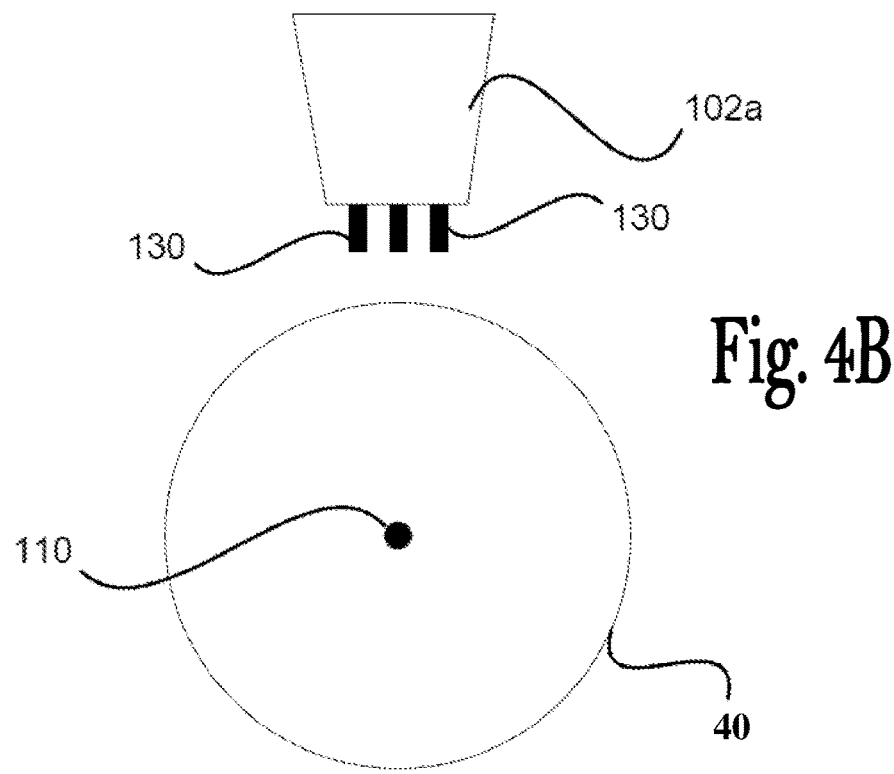

Referring now to FIGS. 4A and 4B, schematically illustrating possible arrangements of printing elements 130 (e.g., nozzles or ejection apertures) on single print head units, according to some possible embodiments.

As exemplified in FIGS. 4A-B, a print head unit may include one or more nozzles or ejection apertures (generally 130) configured for enabling ejection of printing material compositions onto the surface of the substrates 40 (or over previously deposited layers). The material compositions may be fluids (as is the case in inkjet printing, and plastic jetting or/and printing) and/or solids (e.g., powders, as is the case in laser printing). The term printing is herein meant to include any type of ejection of a material onto a surface of a substrate/layer, lines or patterns thereon. Thus printing may include, for example, changing the color, the shape, or the texture of a substrate and/or a multilayered structure printed thereon, by ejecting a material thereon, engraving and/or applying marks thereon. For example, and without being limiting, the printing head units may comprise one or more markers (e.g., engraving tool, laser marker, paint marker, and suchlike) configured to apply visible and/or invisible (i.e., functional, such as electronic charges) markings on the external surfaces of the substrates/multilayer structures traversing the printing zone 12z.

FIG. 4A exemplifies different configurations of printing elements 130 of the print head units 104a and 106a. The print head units 104a and 106a are shown from a side thereof parallel to the translation axis 110. The print head unit 104a includes a plurality of printing elements 130 (e.g., four), set along a row at successive locations along the axis of translation 110. The print head unit 106a in this non-limiting example includes a single printing element 130, as commonly used in the art for jetting plastic compositions.

FIG. 4B exemplifies a possible configuration of the printing elements provided in the print head unit 102a. FIG. 4B shows a front view of the print head unit 102a (perpendicular to the translation axis 110). In this non-limiting example, the print head unit 102a includes a column of printing elements 130 set in a line perpendicular to the translation axis 110. Optionally, not all of the printing elements 130 are perpendicular to the substrate's surface. In the example shown in FIG. 4B, the printing element is perpendicular to the substrate's surface, e.g., is configured for ejecting a material composition along an ejection path perpendicular to the substrate's surface. On the other hand, the outer printing elements located on the sides of the central printing element are oblique to the substrate's surface.

Figure 5A:
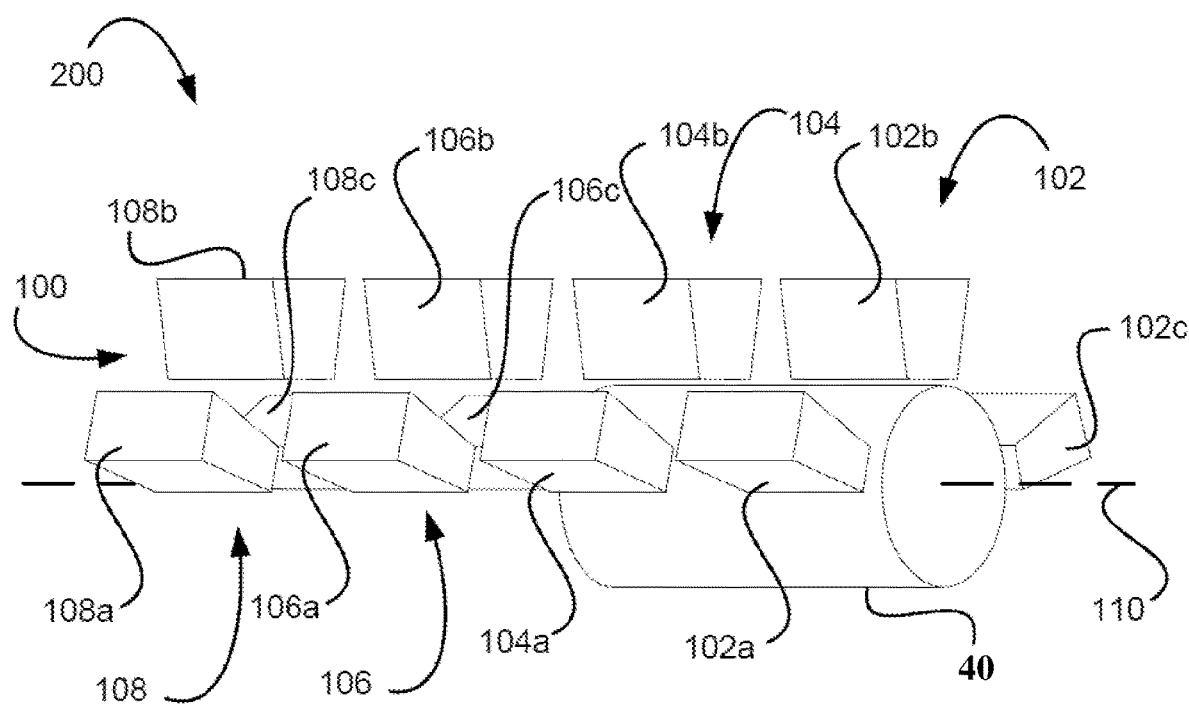
FIGS. 5A and 5B schematically illustrate different views of the printing array according to some possible embodiments, which includes a plurality of groups of print head units located at successive positions along an axis of translation.
Figure 5B:
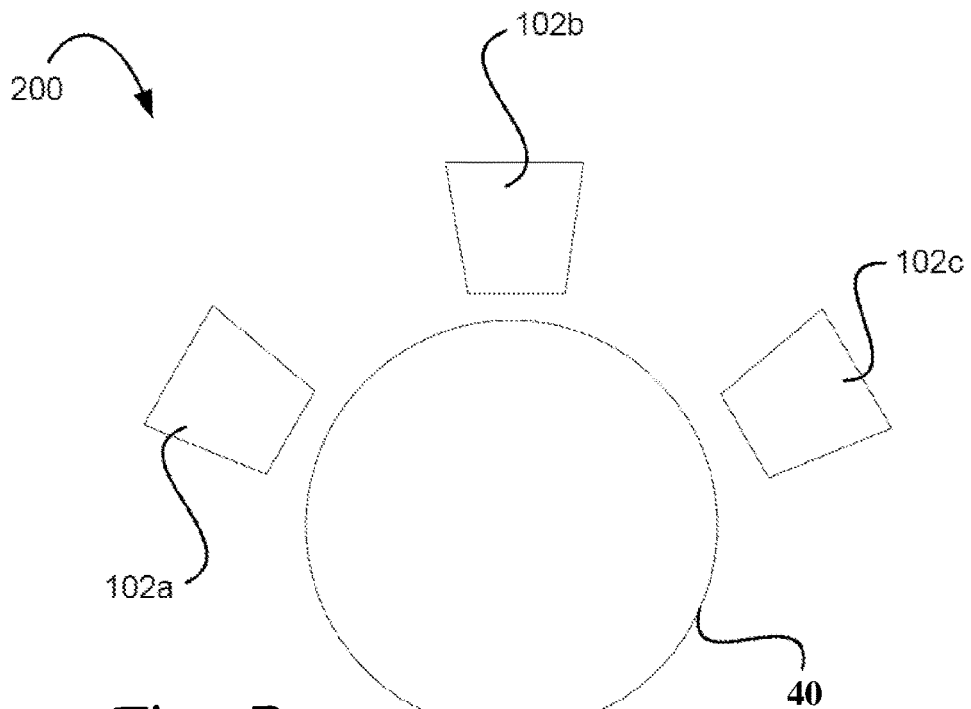

Optionally, a print head unit used in the present invention can include a plurality of rows or columns of printing elements forming a two dimensional array defining a surface of the print head assembly facing the substrate 40. The print head assembly may be configured in any shape, such as, but not limited to, planar, rectangular, parallelogram, or the like. Referring now to FIGS. 5A and 5B, schematically illustrating different views of a printing system 200 of the present disclosure. In FIG. 5A, a perspective view is shown, while in FIG. 5B, a front view is shown. The printing system 200 is configured for printing an image/pattern on a curved outer surface of the substrate 40 (e.g., having a cylindrical shape), and includes a print head assembly 100 having a plurality of print head units, and a conveyor system (302 in FIGS. 6A and 16) configured for moving the substrate 40 and/or the print head units. Optionally, the system 200 includes a control unit (300, shown in FIGS. 2 and 22) configured for controlling the conveyor system 302 and the operation of the print head units. The curved surface of the substrate 40 may be circular, oval, elliptical, etc.

In some embodiments, each print head unit includes one or more printing elements e.g., configured for jetting/applying a printing material composition comprising fusing and/or non-fusing materials (such as ink, powder, curing fluid, fixation fluid, pretreatment fluid, coating fluid, and/or a composition of one or more fluids to create a third fluid, and/or any solid/gas material that, while jetted, is a fluid) onto the outer surface of the substrate 40, as described above. The print head assembly 100 may be designed as the print head assemblies described in FIGS. 3A and 3B, or as a print head assembly 100 in which the print head units are organized in groups, as will be now described hereinbelow.

In the example shown in FIGS. 5A and 5B, the print head units of each group are arranged along a curved path around the axis of translation 110, and each group surrounds a respective region of the axis of translation 110. Thus, the print head units 102a, 102b, and 102c belong to a first group 102. The print head units 104a, 104b, and 104c (seen in FIG. 13) belong to a second group 104. The print head units 106a, 106b, and 106c belong to a third group 106. The print head units 108a, 108b, and 108c belong to a fourth group 108. The groups 102, 104, 106 and 108, are located at respective locations along the axis of translation 110.

The conveyor system 302 is configured to move the substrates 40 and/or the print head assembly 100 such that a desired portion of the substrates 40 is brought to the vicinity of a desired print head unit at a desired time. In this manner, printing can be performed on the substrate's outer surface. The conveyor is configured for enabling at least two kinds of relative motion between the substrates 40 and the print head assembly: (i) a translational motion along or parallel to the axis of translation 110, and (ii) a rotation about the axis of translation 110. In this manner, any point on the outer surface of the substrate 101 can be brought to the vicinity of any print head unit. Optionally, a third kind of relative motion exists along one or more radial (or planar) axes substantially perpendicular to the axis of translation. This third motion may be necessary, in order to maintain a desired distance between at least one print head unit and the substrate's surface.

In some embodiments the control unit (300) is an electronic unit configured to transmit, or transfer from a motion encoder of the carriage, one or more signals to the print head units in the assembly 100 and to the conveyor system 302. Alternatively, the signals from the motion encoder are transferred directly to the print head assembly wherein they are translated by each print head unit into printing instructions based on signals received from the control unit 300. Accordingly, the positional control signal(s) transmitted from one of the carriage's encoders to the print head assembly 100, may be used by the control unit (300) to instruct individual print head units to eject their respective material compositions from one or more printing elements (e.g., nozzles/ejection apertures) at specific times. The control unit 300 further generates control signal(s) to the conveyor system 302, to instruct the conveyor system 302 to move (i.e., translate and/or rotate) the substrates 40 and/or the print head assembly 100 according to a desired pattern. The control unit 300 therefore synchronizes the operation of the print head units with the relative motion between the substrates 40 and the print head assembly 100, in order to create desired printing patterns on the substrates 40, and/or on multilayered structures printed on them, and therefore print a desired pattern thereon.

The groups of print head units are set along the translation axis 110, such that during the relative motion between the substrate 40 and the print head assembly 100, the substrate 101 is successively brought in the vicinity of different print head units or groups of print head units. Moreover, during at least certain stages of this motion, different portions of the substrates 40 may be located in the vicinity of print head units belonging to at least two consecutive groups or print head units located at successive positions along the axis of translation 110. In this manner, the substrate's outer surface, or multilayered structures printed on it, may be printed upon simultaneously by print head units belonging to different groups or print head units located at successive positions along the axis of translation 110. Optionally, different printing elements of a single printing unit may print on two different substrates at the same time. As explained above, this feature enables the system 200 to perform printing on one or more substrates, or on layer printed thereover, while optimizing the utilization of print heads, thereby achieving a high efficiency system capable of providing high objects throughput. As exemplified in FIG. 5A, during a certain time period, the substrate 40 is in the vicinity of the first group (which includes print head units 102a, 102b, and 102c) and the second group (which includes print head units 104a, 104b, and 104c).

Besides enhancing the printing throughput on one or more substrates, the structure of the system 200 also enables simultaneous printing on a plurality of substrates 40. For this purpose, the substrates 40 are fed into the system 200 one after the other, and the conveyor system 302 moves (i.e., translates and/or rotates) the substrates 40 and/or the assembly 100 of print head units, so that each substrate 40 can be printed upon by certain portions of the print head units which are not printing on another substrate. For example, in FIG. 5A, the substrate 40 is in the vicinity of the first and second group (though in practice, a substrate can be printed upon by more than two groups if the substrate is long enough compared to the print heads and to the distances between print heads along the axis of translation). If no other substrate is present, the print head units of the third group (106a, 106b, and 106c) and the print head units of the fourth group (108a, 108b, and 108c) are idle. However, if a second substrate is introduced into the system 200 and moved to the vicinity of the printing heads of the first and/or second group, the first substrate will be moved to the vicinity of the second and/or third groups. In this manner, at least some of latter (second and third) groups of the printing heads will be able to print a multilayered pattern on the first substrate and the former (first and second) groups of the print head units will be able to a multilayered pattern on the second substrate.

The printing system is considered fully utilized when under all the print heads units there are substrates that are being printed on by the print heads units. To this end, any gap between the substrates 40 in the printing zone is considered as decreasing the efficiency, and therefore it is required that gaps between the substrates 40 be minimized.

As can be seen in FIG. 5B, the print head units of each group are set around the translation axis 110, so as to maintain a desired distance from the substrate's outer surface. The print head units may be set in a spaced apart arrangement, or may be adjacent to each other. The distances between consecutive print head units belonging to the same group may be equal to each other or different to each other. Moreover, within a group, the print head units may be set around the substrate's outer surface, such that the distances between the different print head units and the substrate's outer surface are equal to each other, or such that each print head unit has a respective distance from the substrate's outer surface. The distance between the print head units and the substrate's outer surface depends on the type of print head units used and composition, and is chosen so that the print head units deliver their compositions in a desired fashion. It should be noticed that the composition jetted by the print head units may be a chemical material, a chemical compound of materials and/or a mixture between materials and/or compounds.

In some embodiments of the present invention, the printing on the substrate's surface, and/or on multilayered structures printed on it, by different print head units or by different printing elements 130 of a print head unit may be performed for the purpose of creating a new path that was not printed beforehand. Optionally, some of the printing may be performed along or near an existing printed path. A path printed near or between two other paths may be used to achieve a predefined resolution. A path printed along an existing path may be used to complete the resolution of the existing path by adding more dots to create a denser spiral path. Moreover, printing a path along an existing path may be used to create redundancy between two different printing elements, i.e., if one printing element is not working then the second printing element prints a portion (e.g., 50%) of the desired data. Optionally, in case one of the printing element stops operating, the system can be controlled so as to enable the second printing element to print the data that was originally intended to be printed by the first printing element. This may be done, for example, by controlling (e.g., slowing) down the motion (translation and/or rotation) of the substrates 40 and/or print head array, or by controlling the second printing element to jet more ink. Optionally, the print head units belonging to the same group are configured for jetting printing material compositions of the same type (e.g., non-fusible), and the different groups of print head units are configured for jetting other types (e.g., fusible) printing material compositions e.g., having different colors. Alternatively, different print head units belonging to the same group are configured for jetting printing material compositions of different types and of different colors.

It should be noted that although in the above-mentioned figures each group is shown to include three print head units, the groups may have any number of printing units, for example, one, two, four, etc. Moreover, though the above-mentioned figures show the presence of four groups, any number of groups may be included in the system of the present invention. Additionally, the print head units in the above-mentioned figures are shown to be shorter than the length of the substrate 40. This may not be the case, as in some cases, the print head units may be as long as the substrate 40, or even longer than the substrate 40.

The system 200 can be used to print on the substrate 40 according to two different printing sequences: continuous printing and step printing or any combination thereof. In continuous printing, the printing occurs during the relative motion between the substrate 40 and the print head arrangement 100, when such motion includes simultaneous translational motion along or parallel to the axis of translation 110 and a rotational motion around the axis of translation 110. In this kind of printing, layer of printing material compositions are printed along a substantially spiral path.

In step printing, a relative translation between the substrate 40 and the print heads brings desired regions of the substrate's surface, and of layers printed thereon, to the vicinity of one or more print head groups or print head units located at successive positions along the axis of translation. The translation is stopped, while the relative rotation is effected. During the rotation, the print head units perform circumferential printing on the substrate's surface, and/or on layers printed thereon. After the printing is performed, the relative translation re-starts to bring one or more additional desired regions of the substrate's surface, and/or on layers printed thereon, to the vicinity of one or more print head groups. The rotation may be maintained during the translation, or be discontinued at least during part of the translation.

The steps may be small steps, where translation occurs for moving a desired region of the substrate 40 from one printing element 130 to a consecutive printing element 130 of a single print head unit, or may be larger steps, where translation occurs for moving a desired region of the substrate 40 from a first print head unit to a successive print head unit (e.g., belonging to a different group) along the axis of translation 110. In some embodiments, the steps may be large enough to translate a desired region of the substrate 40 from a first print head unit to a second print head unit while skipping one or more intermediate print head units.

In step printing, the circumferential printing may be activated by a trigger which confirms that the desired region of the substrate 40 has been translated by a desired distance. This trigger may be a positioning encoder signal and/or an index signal, which is active during translation and non active when no translation occurs. Knowing the speed of translation and the position (along the axis of translation) of the desired print head units and its printing elements 130, the time point at which the desired region of the substrate 40, and/or on layers printed thereon, is exposed to the desired print head unit, and its printing element 130 can be calculated. Thus, when the trigger is activated by the positioning encoder and/or index signal, an instruction to effect printing is sent to the desired print head unit, and/or printing element 130 for example, according to the encoder position signals. Alternatively, the trigger may be activated by a light detector located on one side of the substrate 40 and corresponding light emitters located on a second side of the substrate 40. When the substrate 40 obscures the light detector, and the light from the light emitter does not reach the light detector, it is deemed that the desired region of the substrate's surface, and/or on layers printed thereon, has been translated by the desired amount.

Optionally, a circumferential coordinate of a certain region of the substrate's surface is monitored (e.g., calculated via a known speed of rotation and the known radius of the substrate), and a second trigger is activated when the region reaches a desired circumferential coordinate which corresponds to the circumferential coordinate of desired print head unit, or printing element 130. In a variant, after translation is stopped, the relative rotation is performed to expose the desired region on the substrate's surface to the desired print head unit, or printing element 130, and only then printing (ejection of the material composition) is effected. In another variant, the second trigger is not used, and when translation ceases, the desired region of the substrate's surface is exposed to a different print head unit, or printing element 130. Because the circumferential coordinate of desired region is known, the control unit can instruct the different print head unit or printing element 130, to affect a desired printing onto the desired region. This last variant is useful for decreasing delays in the printing. A possible printing pattern may include both continuous printing and step printing, performed at different times.

It should be noted that the axis of translation 110 is shown in the figures as a straight line. This may not necessarily be the case. In fact, the axis of translation may be curvilinear, or may have straight sections and curvilinear sections.

Figure 6A:
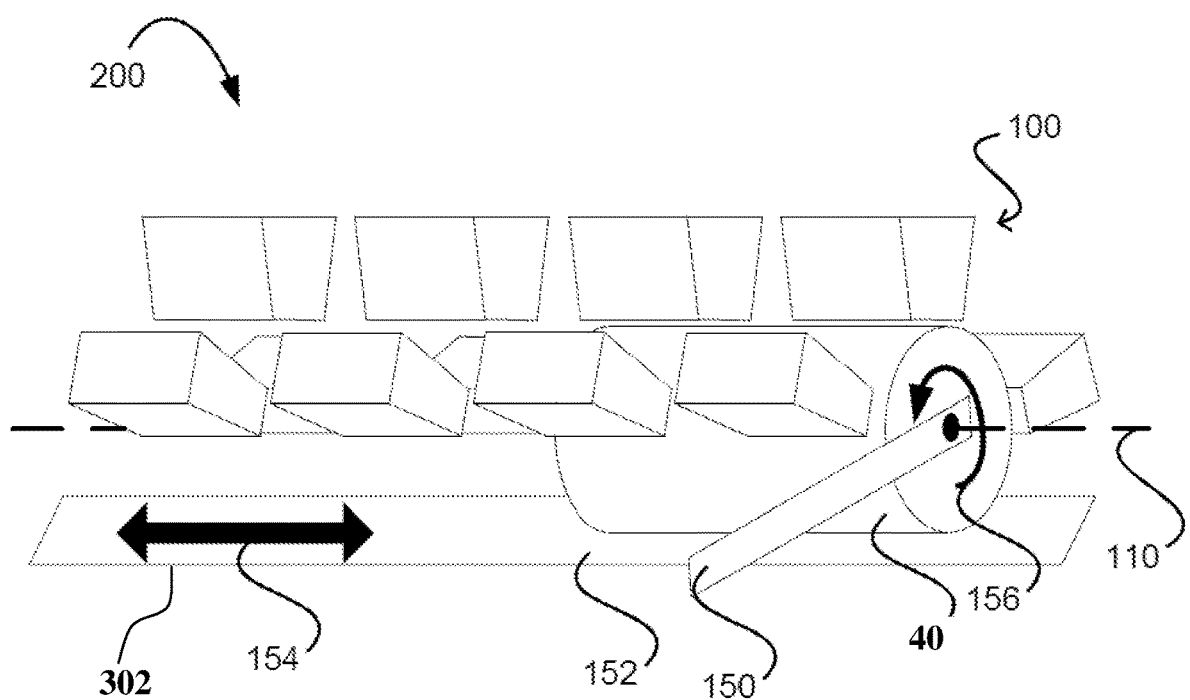
FIGS. 6A and 6B are schematic drawings exemplifying use of a conveyor system according to some possible embodiments.
Figure 6B:
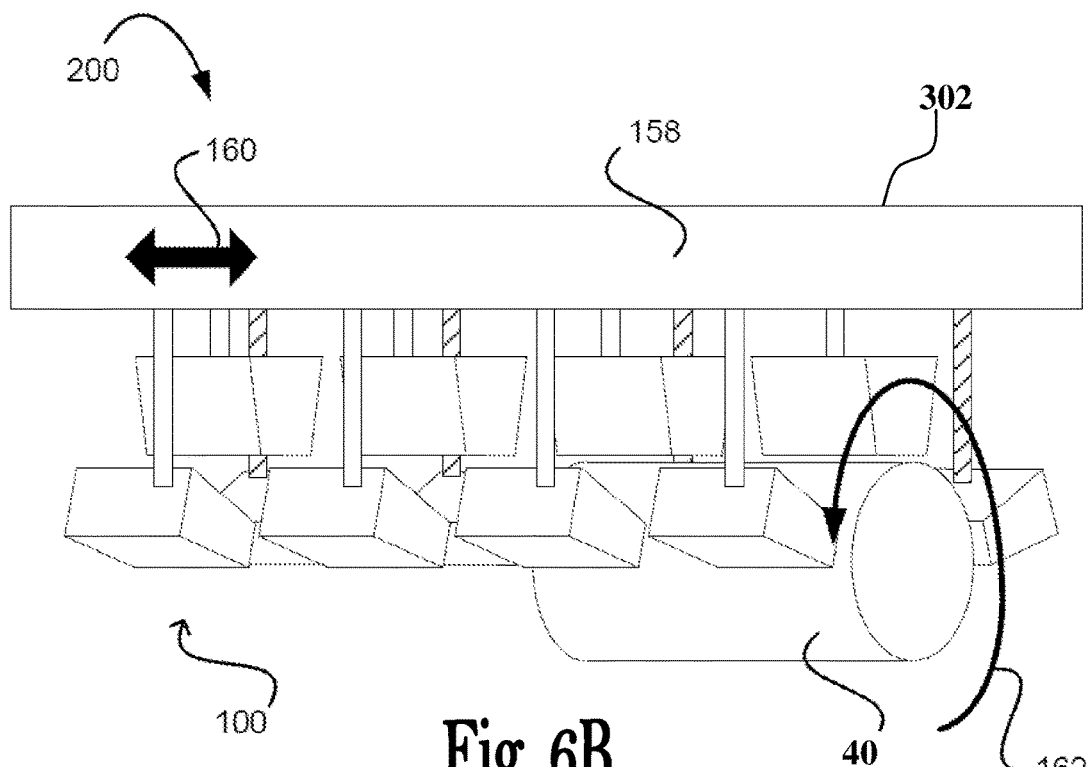

Referring now to FIGS. 6A and 6B, which exemplify a conveyor system 302 included in the printing system in some embodiments. In the non-limiting example illustrated in FIG. 6A the conveyor system 302 is configured to move the substrate 40, while in FIG. 6B the conveyor system 302 is configured to move the assembly of print heads 100.

In the non-limiting example shown in FIG. 6A, the conveyor system 302 of the system 200 includes a substrate holder 150 joined to an end of the substrate 40. In a variant, the substrate holder moves the substrate 40 along the translation axis 110, and rotates the substrate around the translation axis 110. The translation and rotation may or may not be simultaneous, depending on the desired manner of printing. Optionally, the conveyor system 302 includes a conveyor belt 152, which is configured to move the substrate 40 along the translation axis 110 (as shown by the double arrow 154), while the substrate holder's function is limited to rotating the substrate 40 (as shown by the arrow 156).

The conveyor belt 152 may be a belt that is moved by a motion system, such as an electrical motor, linear motor system, multiple linear motor systems that combine to form a route, a magnetic linear system, or an air pressure flow system. In case a plurality of substrates 40 is handled, each of the substrates 40 may be handled separately by one or more substrate holders. It may be the case that at different places along the translation axis 110 each of the substrate 40 is controlled to translate in a different manner (e.g., at a different speed) along the translation axis 110.

In the non-limiting example shown in FIG. 6B, the conveyor system 302 of the system 200 includes a carriage 158. The carriage 158 in this example carries the print head assembly 100 along a direction parallel to the translation axis 110 (as shown by the double arrow 160) and rotates with the print head units around the translation axis (as shown by the arrow 162).

It should be noted that, although not illustrated in the figures, other scenarios are also possible for giving rise to the relative translational and rotational motion between the substrate 40 and the print head arrangement. In a first possible scenario, the conveyor system 302 is designed for moving the print head assembly 100 along the axis of translation 110 and includes a substrate holder for rotating the substrate 40 around the axis of translation 110. In a second possible scenario, the conveyor system 302 is designed for moving the substrate 40 along the axis of translation 110 and for rotating the print head arrangement around the axis of translation 110.

In some embodiments both the substrate 40 and the print head arrangements 100 may be moved.

All the above-described manners of relative motion (fixed print head units and moving substrate, moving print head units and fixed substrate, translating the substrate and rotating the print head arrangement, rotating the substrate and translating the print head arrangement, moving print head units and moving substrate) are within the scope of the present invention and equivalent to each other. In order to simplify the description of the invention, in the remaining part of this document the description will relate to the case in which the print head units are fixed and the substrate 40 is moved (translated and rotated). However, references to the motion of the substrate 40 should be understood as references to the relative motion between the substrate 40 and the print head unit arrangements 100.

In both of the cases described above, individual print head units and/or individual groups may be movable along the translation axis 110 with respect to each other. This may be used for manual and/or automatic calibration prior and/or post printing. Optionally, individual print head units and/or groups may be movable around or perpendicularly to the translation axis 110. This may also be used for manual and/or automatic calibration prior and/or post printing.

Figure 7A:
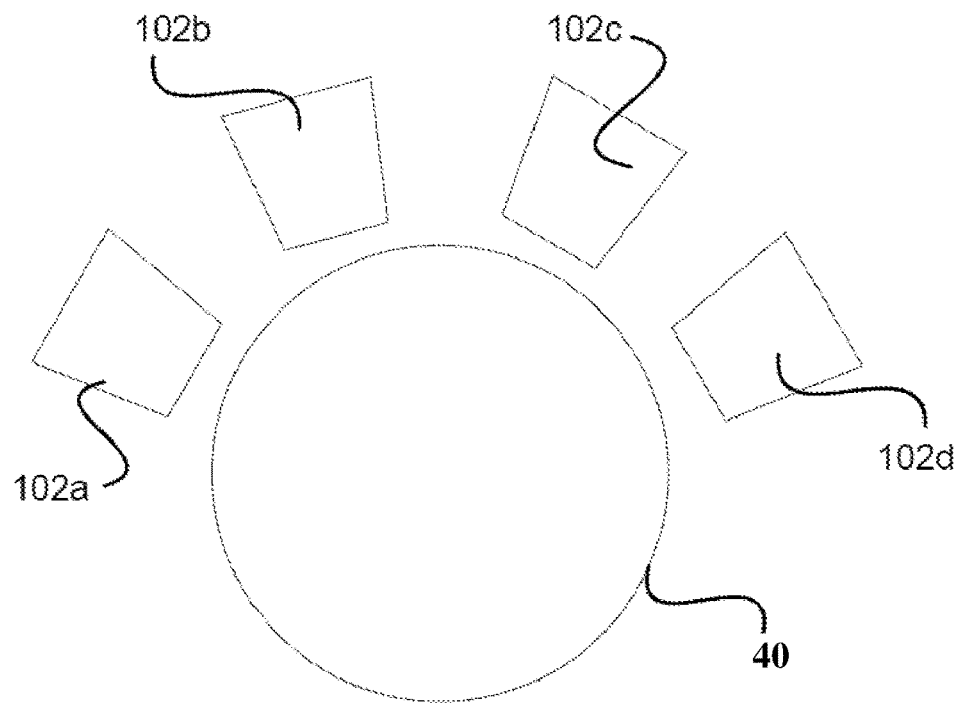
FIGS. 7A and 7B schematically illustrate some possible embodiments in which the print head units are controllably movable.
Figure 7B:
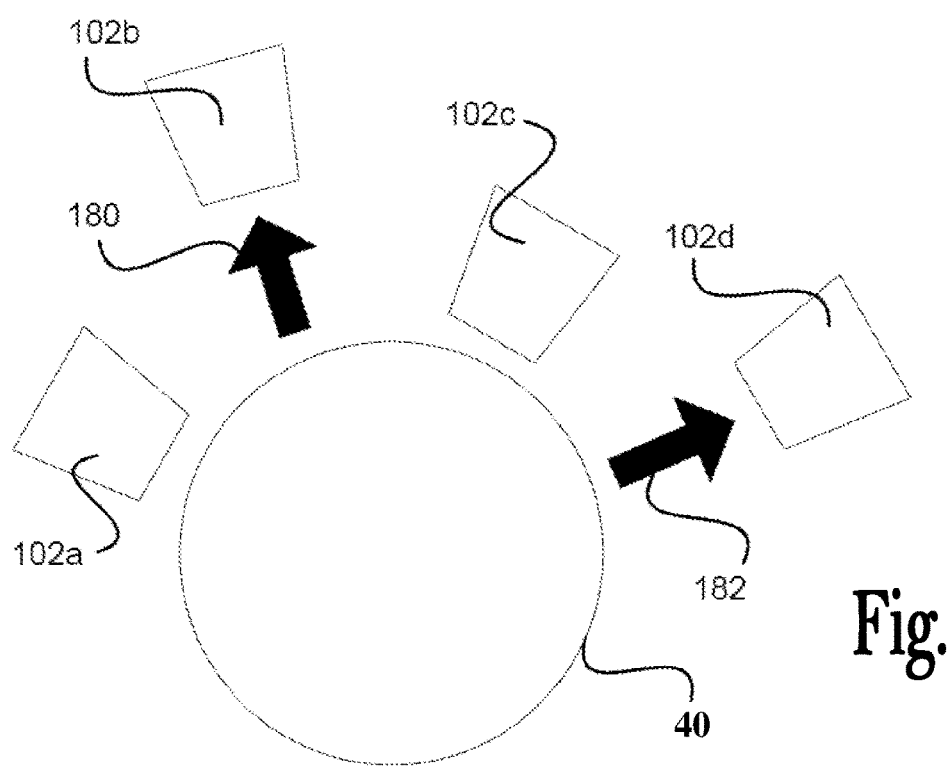

Referring now to FIGS. 7A and 7B, which are schematic drawings illustrating some possible embodiments in which the individual print head units are controllably movable.

In FIG. 7A, the print head units 102a-102d belong to a single group and are set along the circumference of the substrate 40. In FIG. 7B, the print head units 102b and 102d are moved away from the translation axis (or from the substrate 40), as depicted by the arrows 180 and 182, respectively. In some embodiments of the present invention, at least some print head units can be individually moved toward and away from the substrate 40. Optionally such motion for each print head unit occurs along a respective axis which is perpendicular to the translation axis. Optionally, the orientation of individual print head units can be adjusted as well.

The ability to move the print head units enables maintaining a desired distance between the print head units and the substrate 40. Also, the moving of the print head units enables moving the selected print head units between their active positions and their passive positions. This gives flexibility to the print head assembly, as it can be configured in different manners to print on surfaces of different diameters and lengths (e.g., for substrates of small diameters, the number of active print head units in a group is decreased, to enable the active print heads to be at a desired distance from the substrate's outer surface). In a variant, the print head units can be moved only prior to the printing, i.e., after the substrate starts to move the print head units maintain their position with respect to the axis of translation. This feature is advantageous, as it enables the system 200 to keep a desired distance between the print head units and substrate 40 having a plurality of different diameters and lengths. In another variant, the print head units can be moved during the printing. The latter feature may be advantageous in the instance in which the cross-sectional size and/or shape of the substrate 40 varies along the length of the substrate, or in the cases where the substrate 40 is not circular (as exemplified in FIGS. 8A to 8C).

Figure 8A:
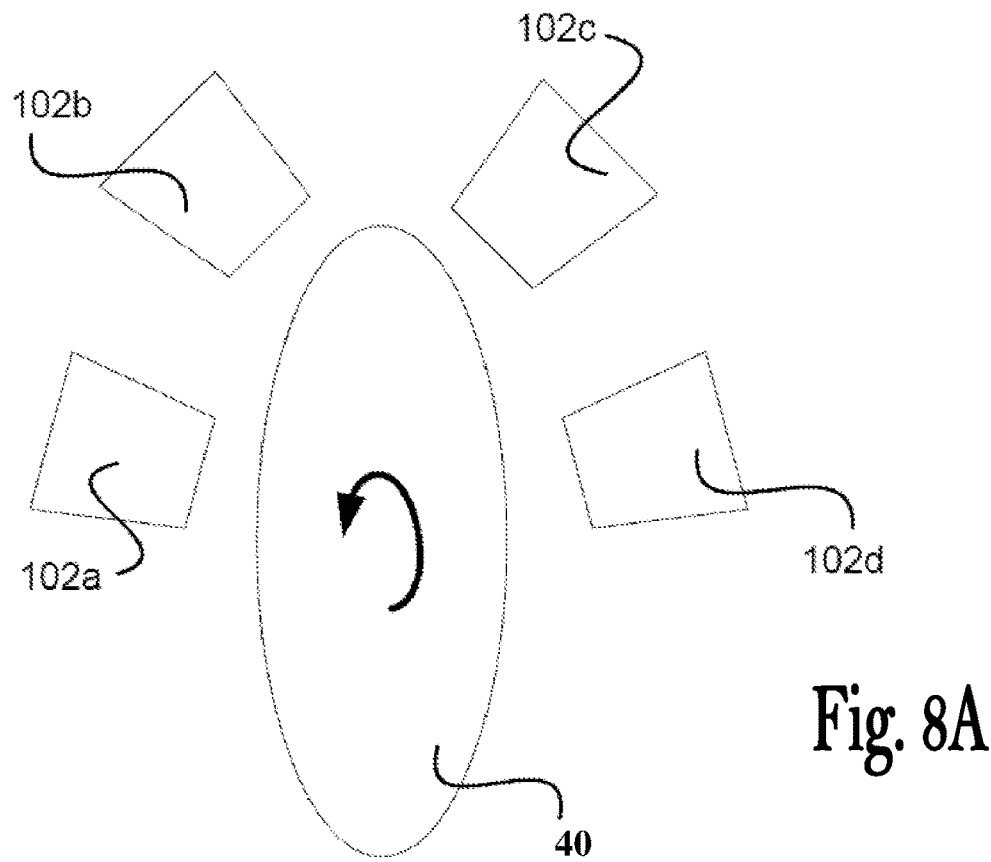
Figure 8B:
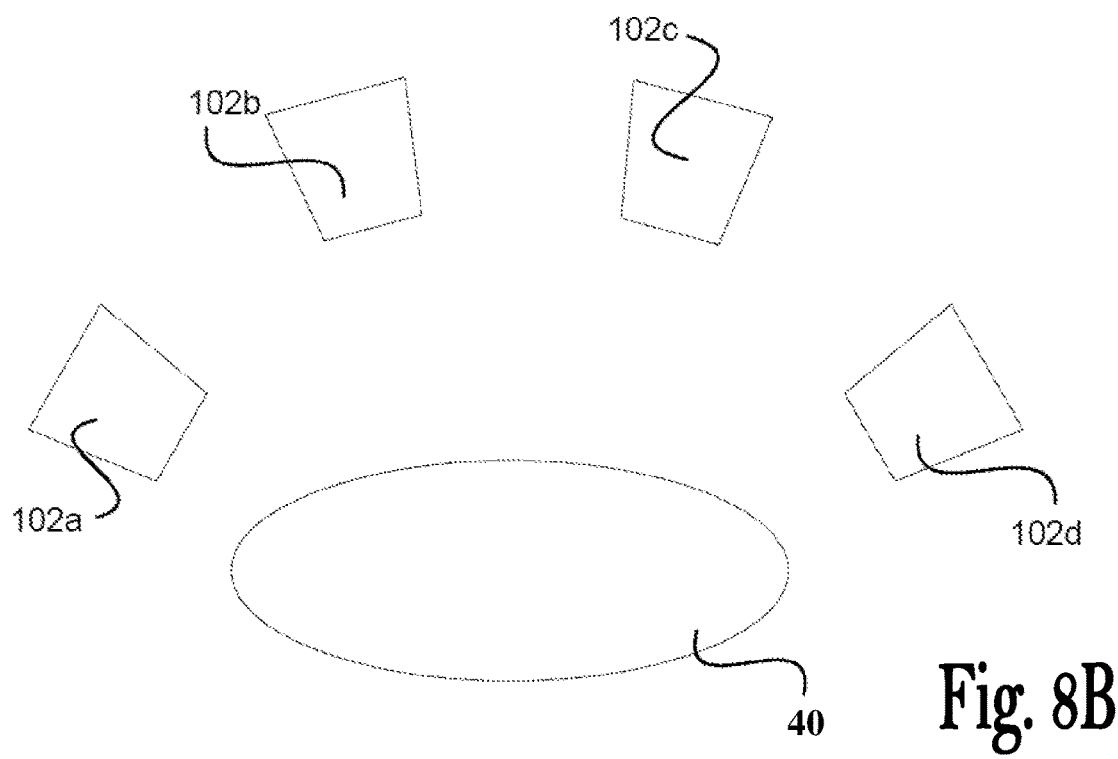

Referring now to FIGS. 8A to 8C, exemplifying embodiments in which the print head units are controllably movable to fit a shape of the substrate 40, before and during rotation of the substrate 40.

In FIG. 8A, a substrate 40 having an elliptical cross section is brought to the system 100. The print head units 102a-102d belong to a single group and are initially set to match the shape of a circular substrate 40. In FIG. 8B, the print head units 102b and 102c are moved toward the translation axis (located at the center of the elliptical cross section on the substrate 40 and moving out of the page), so that a desired distance is maintained between the substrates' outer surface and each print head unit. The substrate 40 is rotated. During the rotation, the print head units 102a-102d are moved with respect to the translation axis, and optionally their orientation is varied. At a certain time, the substrate 40 has rotated by 90 degrees (see FIG. 8B-C). The print head units 102a and 102d have been retract relative to the translation axis, while the print head units 102b and 102c have been moved toward the translation axis. In this manner, a desired distance between the print head units and the substrate's surface, and/or the layers printed thereon, is maintained. Moreover, the orientation of all of the print head units has been changed, in order to maintain a desired orientation with respect to the regions of the substrates and the layers printed thereon that are exposed to the print head units.

It should be noted that in the previous figures, print head units of the same group have been shown to be located at the same coordinate along the axis of translation 110. However, this need not be the case. Referring now to FIGS. 9A and 9B, exemplifying two optional arrangements of print head units belonging to a group. In FIG. 9A a schematic drawing exemplifies some possible embodiments in which the print head units belonging to the same group are positioned at the same location along the axis of translation 110. FIG. 9B is a schematic drawing exemplifying some possible embodiments in which the print head units belonging to the same group are staggered i.e., being positioned at different locations along the axis of translation 110.

In FIG. 9A, all the print head units belonging to the same group are positioned at a same location X along the axis of translation 110. In other words, the projections of the different print head units of the same group on the translation axis 110 fall on the same region of the translation axis. In FIG. 9B, each print head unit of the same group is positioned at a respective location along the translation axis 110. The print head unit 102a is centered at coordinate A on the axis of translation 110. The print head unit 102b is centered at coordinate B. The print head unit 102c is centered at coordinate C. The print head unit 102d is centered at coordinate D. In other words, projections along the translation axis of at least two of the print head units of the at least one group fall on a different regions of the translation axis 110.

Referring now to FIG. 10A, which exemplifies some embodiments in which at least one curing/drying station is located at the end of the print unit assembly 100, downstream of the last group of print head units.

In FIG. 10A, the substrate 40 is moved from right to left, in the direction 201. During this translation, regions of the substrate's surface, and/or of layers printed on it, are successively exposed to the print head units of the groups 102, 104, 106, and 108 (or to print head units 102a, 104a, 106a, and 108a, if the print head assembly 100 is set according to FIGS. 2A and 2B) and printed upon. The printing may be continuous printing or step printing, as described above. In some embodiments of the present invention, a curing/drying station 202 is located downstream from the last group 108 (or the last print head unit 108a). After receiving ink from the print head units, the substrate 40 is moved to the curing/drying station, where the ink is fixed on the substrate's surface, and/or to surface of layers printed on it. The curing/drying may be performed according to any known technique, such as: exposing the printed surface to ultraviolet (UV) light without or with any combination of gas or external liquid to enhance the curing/drying speed; exposing the printed surface to an electrical beam (EB); heating the surface via exposure to IR (infra red) radiation; ventilation drying. These techniques maybe used for curing/drying after the printing is performed.

Techniques may also be used for priming/pre-treating the substrate's surface prior to printing: exposing the printed surface of the substrate 40 to a flame, and/or plasma, and/or corona, and/or surface cleaning equipment: and/or antistatic equipment; surface heating or drying equipment; applying a primer or coating material to the surface; exposing the surface printed or unprinted to a gas, such as nitrogen or an inert to enhance later curing. To this end, optionally, a priming station 204 is located upstream from the first print head group 102 (or the first print head unit 102a). In the priming station 204, the surface of the substrate 40 is treated so as to enhance the imminent printing upon it. The priming may be performed according to any of the above-mentioned manners used for priming/pretreating.

It should be noticed that the curing/drying station may include a single curing/drying unit or a group of curing/drying units set around the translation axis 110. Similarly, the priming station may include a single priming unit or a group of priming units set around the translation axis 110.

Referring now to FIG. 10B, a schematic drawing exemplifying some embodiments in which at least one curing/drying station and/or priming/pre-treating station is located between two successive groups of print head units.

In some embodiments, it may be desirable to have a curing or priming station after (downstream from) one or some of the groups of print head units (or after some of the print head units located at successive positions along the axis of translation). For example, and without being limiting, if consecutive groups or print head units apply to the substrate 40 compositions that may mix together and yield undesirable results a curing station is needed between these two consecutive groups or print head units. In another example, certain print head units or the print head units of a certain groups are configured for jetting a composition which needs a certain kind of priming prior to application on the substrate's surface. In this case, a priming station needs to be placed before the certain print head units or certain groups.

In the non-limiting example of FIG. 10B, a curing/drying and/or priming/pre-treating station 206 is located between the groups 102 and 104 (or print head units 102a and 104a), a curing/drying and/or priming/pre-treating station 208 is located between the groups 104 and 106 (or print head units 104a and 106a), and a curing/drying and/or priming/pre-treating station 210 is located between the groups 106 and 108 (or print head units 106a and 108a).

Figure 10C:
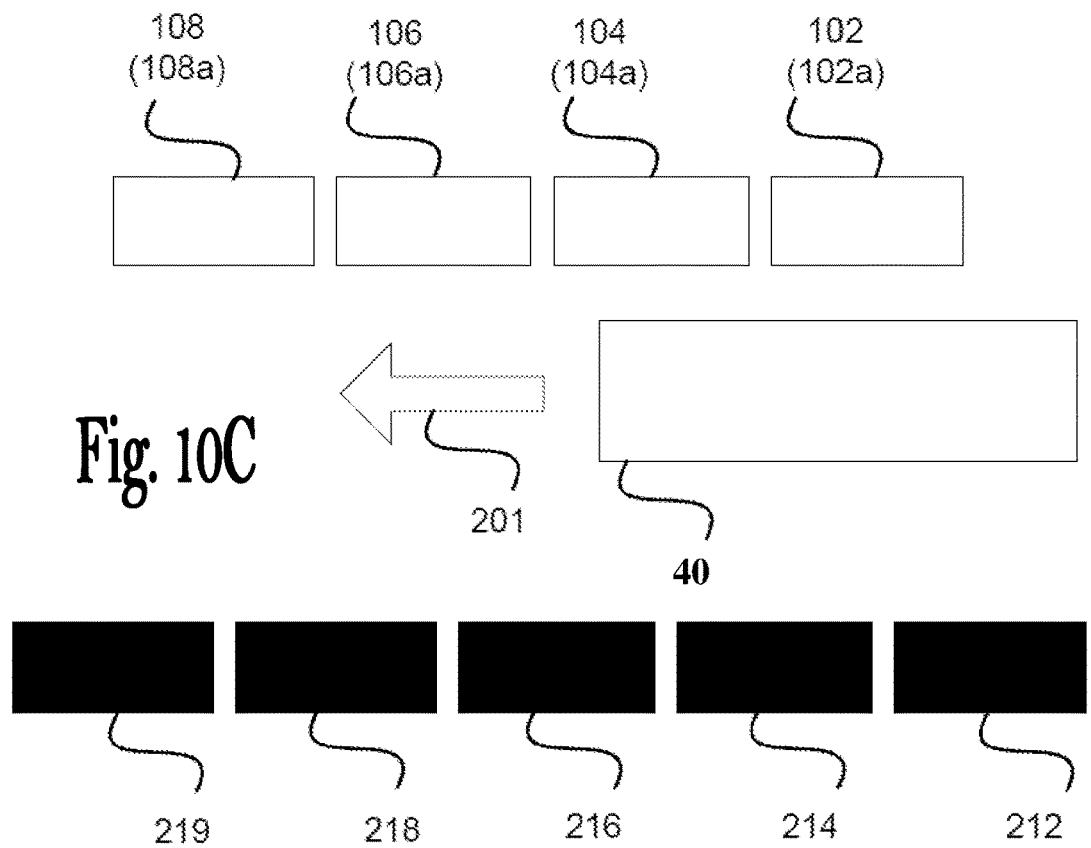

Referring now to FIG. 10C, a schematic drawing exemplifying some embodiments in which a plurality of curing/drying/priming/pre-treating stations are positioned one after the other along the axis of translation. In this non-limiting example, the curing/drying/priming/pre-treating stations 212, 214, 216, 218, 219 are located below the substrate 40, while the print head groups (or the individual print head units) are located above the substrate 40. In this manner, the printing and the curing/drying/priming/pre-treating may be performed simultaneously. Optionally, the stations 212, 214, 216, 218, 219 may be part of a single long station having a plurality of printing elements. This is advantageous since it creates a curing/drying/priming/pre-treating to each printed layer on each cycle.

Figure 10D:
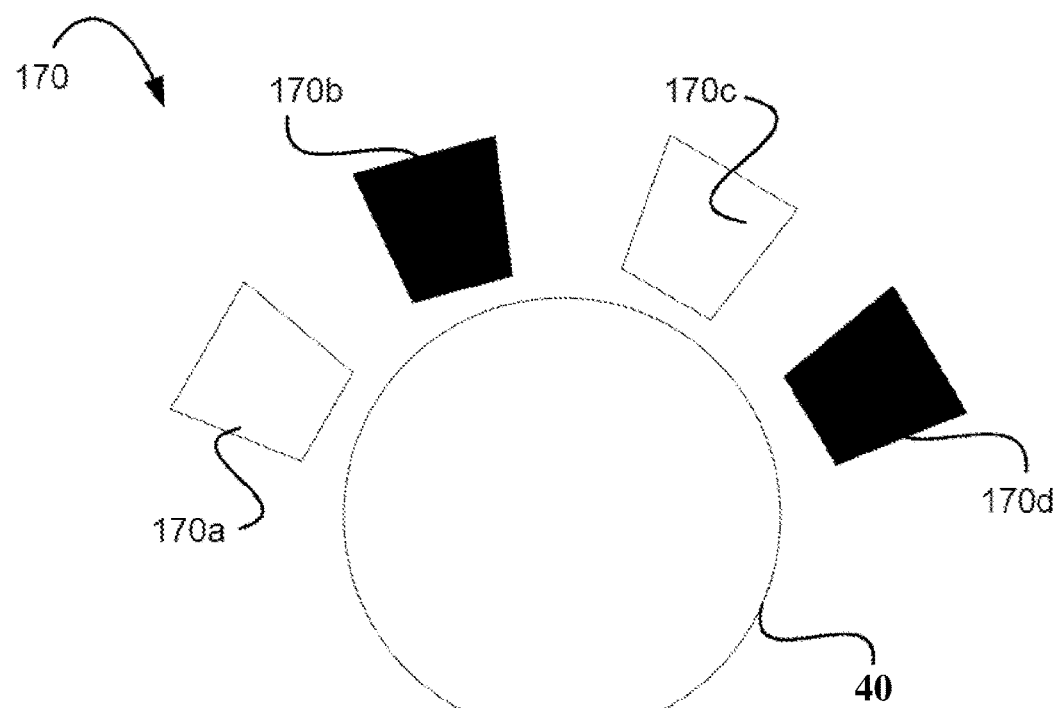

Referring now to FIG. 10D, a schematic drawing exemplifying some embodiments in which at least one curing/drying and/or priming/pre-treating unit is part of a group of print head units. In this non-limiting example, the group 170 includes print head units 170a and 170c and curing/drying and/or priming/pre-treating units 170b and 170d. This enables curing/drying and/or priming/pre-treating to be performed before, between, or after printing by individual print head units.

It is that in some embodiments shown in FIGS. 10A to 10D self-fixated inks, such as hotmelt type of inks may be advantageously used in the print head units 35. Such self-fixated inks are typically configured to instantly fixate after injected from the printing elements of the print head upon reaching the surface of the substrate 40, and/or of layer printed thereon. Accordingly, such possible embodiments employing self-fixated inks may utilize one curing zone at the end of the printing process. Furthermore, in such possible embodiments wherein a single curing zone is employed at the end of the printing process allows designing printing head assemblies having shorter lengths and higher accuracies.

Figure 11A:
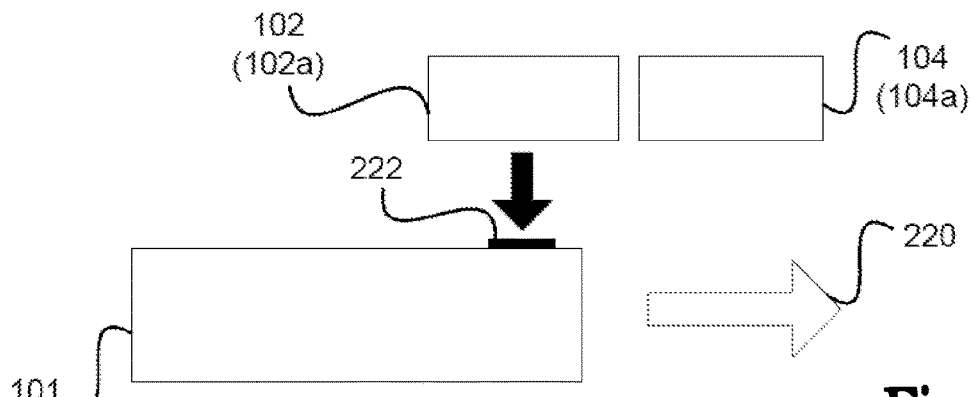
FIGS. 11A to 11C schematically illustrate some embodiments in which first and second compositions are jetted on the same location of the substrate's surface, and/or on any layered structures which may be printed on it, by print head units of first and second groups respectively, in order to print the location with a third composition which is formed by a combination of the first and second compositions.
Figure 11B:
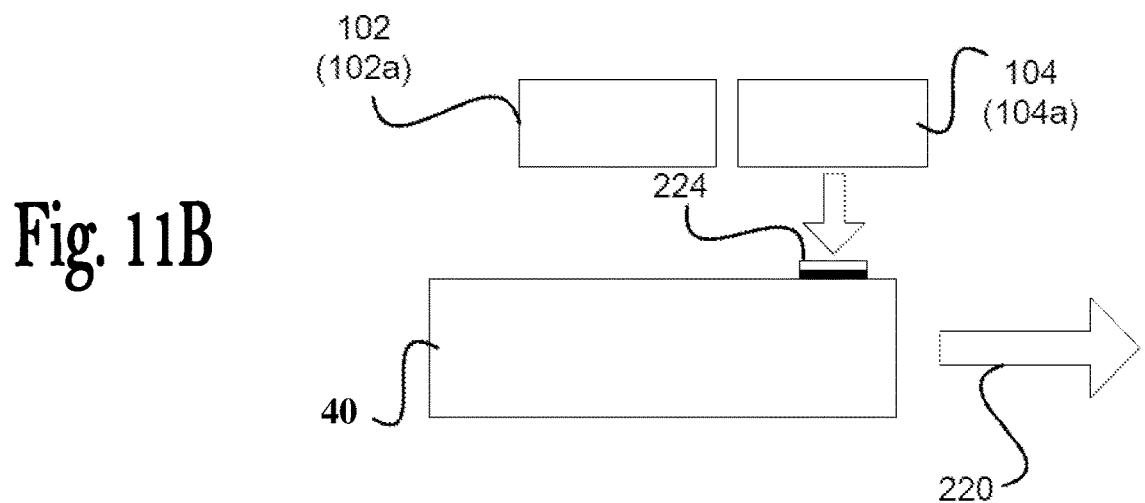
Figure 11C:
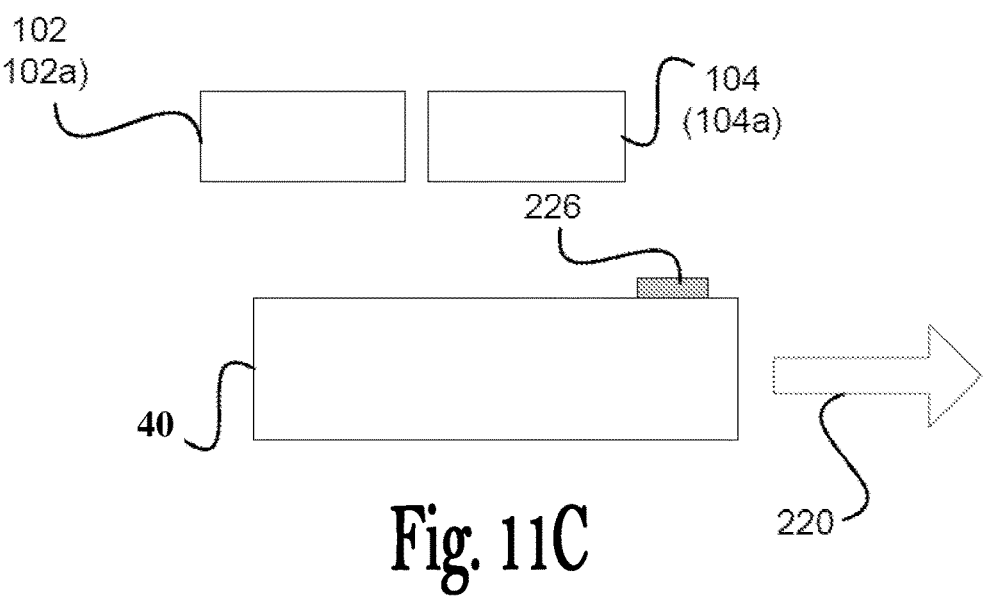

Referring now to FIGS. 11A to 11C, which are schematic drawings illustrating some possible embodiments in which first and second compositions are jetted on the same location of the substrate's surface by print head units of first and second groups respectively (or by first and second print head units), in order to print the location with a third composition which is formed by a combination of the first and second compositions.

In FIG. 11A, the substrate 40 is moved in the direction 220 along the axis of translation so that a certain region of the substrate's surface, and/or of layers printed on it, is exposed to a print head unit of a first group 102 (or to a first print head unit 102a, if the print head assembly is configured according to the examples of FIG. 2A or 2B). The print head unit jets a first composition 222 on the region of the substrate's surface, and/or of the layers printed on it, according to an instruction from the control unit (300). In FIG. 11B, the substrate 40 is moved in the direction 220 by the conveyor system (302), so that the region of the substrate's surface, and/or of layers printed on it, is exposed to a print head unit of a second group 104 (or to a second print head unit 104a). At this point, the control unit instructs the print head of the second group to jet a second composition 224 on the region which received the first composition. At FIG. 11C, the first and second compositions combine and yield a third composition 226. The combination of the first and second compositions may be a mixing or a chemical reaction. The mixing may be mixing of printing material compositions of two different types/colors for generating a desired printing material composition of a third type/color.

This setup is advantageous in the instance in which the third composition 226 cannot be printed by the desired printing system. For example, and without being limiting, if the third composition is a solid, the third composition cannon be ejected in inkjet printing. The first and second liquid compositions are to be combined during the printing process according to the techniques of FIGS. 11A to 11C, if they are to be delivered by print head units in liquid form to the target area. On the target area, the combination between the liquid compounds will occur to form the solid composition.

A solid composition is an extreme example. In fact, even a desired liquid composition having fluid viscosity above a certain threshold cannot be delivered by certain print head units (many inkjet print head units, for example, can jet liquids having viscosity between 10-15 centipoises). However if the component compositions of the desired composition have a viscosity that is below the operating threshold of the print head units, the component compositions can be delivered by successive print head units and mix on the target area to form the more viscous desired composition.

Figure 12A:
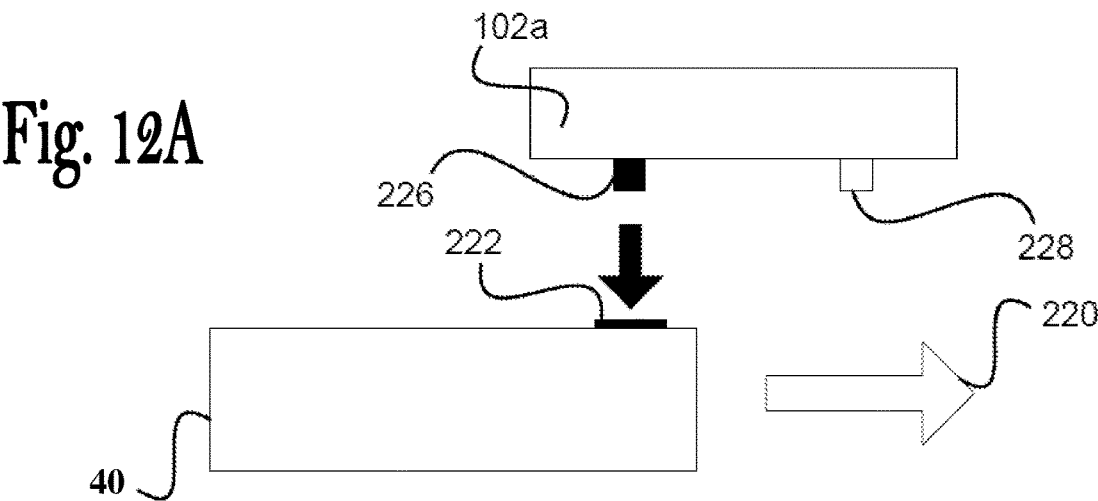
FIGS. 12A to 12C schematically illustrate some embodiments in which first and second compositions are jetted on the same location of the substrate's surface by different nozzles belonging to a single print head unit, in order to print the location with a third composition which is formed by a combination of the first and second compositions.
Figure 12B:
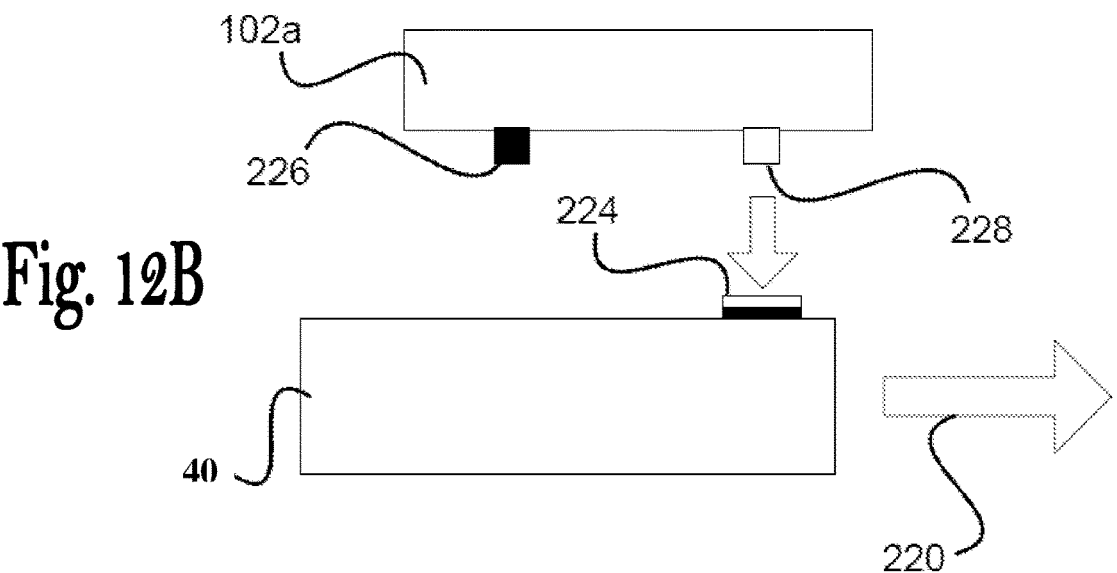
Figure 12C:
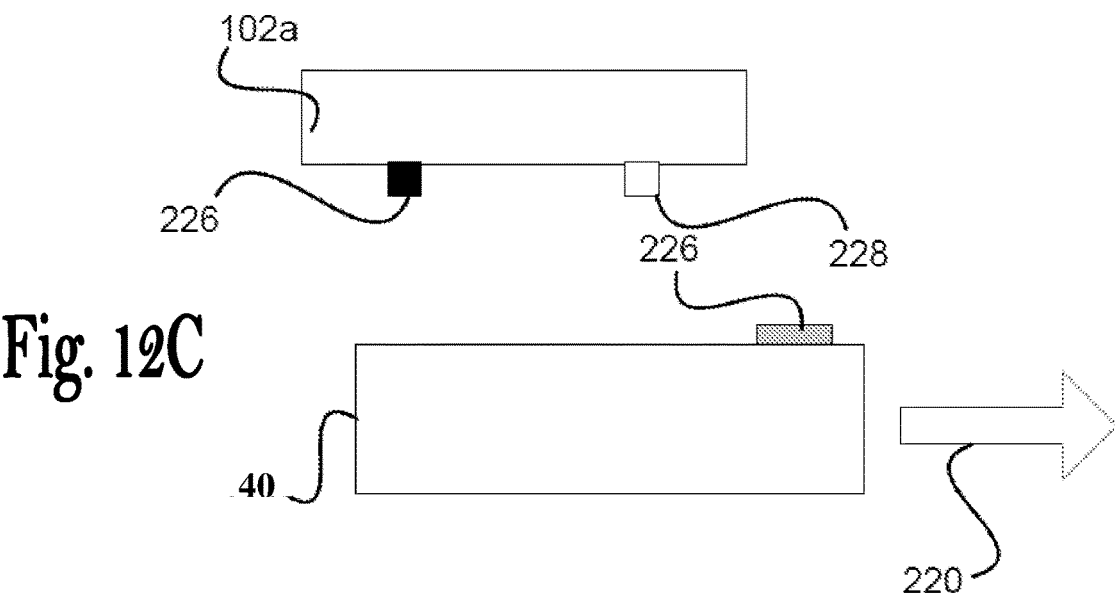

The combination of compositions described in FIGS. 11A to 11C may be achieved by a single print head unit 102a having at least two printing elements 226 and 228, as depicted by FIGS. 12A to 12C. In this non-limiting example, the first printing element 226 ejects the first composition 222 on a certain region of the surface of the substrate 40, and/or of layers printing on it, and the second printing element 228 ejects the second composition 224 on the certain region of the surface of the substrate 40.

Figure 13A:
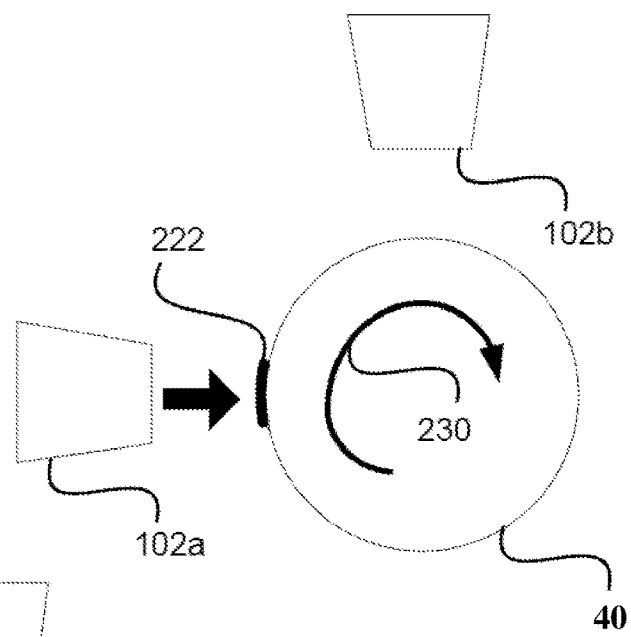
FIGS. 13A to 13C schematically illustrate some embodiments in which first and second compositions are jetted on the same location of the substrate's surface by respectively first and second print head units of the same group, in order to print the location with a third composition which is formed by a combination of the first and second compositions.
Figure 13B:
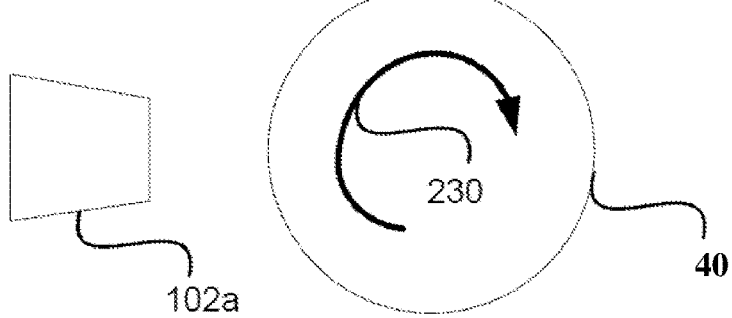
Figure 13C:
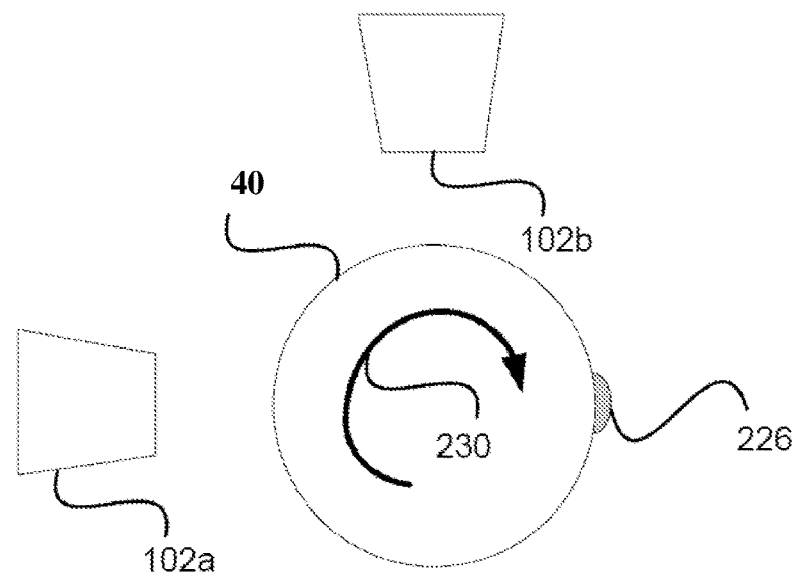

Referring now to FIGS. 13A to 13C, which are schematic drawings illustrating some possible embodiments in which first and second compositions are jetted on the same location of the substrate's surface, and/or of layers printed on it, by respectively first and second printing units of the same group, in order to print the location with a third composition which is formed by a combination of the first and second compositions.

In FIG. 13A, a first print head unit 102a jets a first composition 222 on a certain region of the substrate's surface, and/or of layers printed on it, according to an instruction from the control unit (300), while the substrate 40 rotates in the direction 230 around the axis of translation. In FIG. 13B, the substrate 40 is rotated in the direction 230, and the region which received the first composition 222 is brought to the vicinity of a second print head unit 102b belonging to the same group as the first print head unit 102a. At this point, the control unit instructs the second print head unit 102b to jet a second composition 224 upon the region which previously received the first composition 222. In FIG. 13C, the first and second compositions combine together (e.g., by reacting chemically or mixing) and yield a third composition 226. As above, this setup is advantageous in the instance in which the third composition 226 cannot be printed by the printing system.

It should be noted that though the examples of FIGS. 11A-11C, 12A-12C, and 13A-13C relate to printing a desired composition formed by two component compositions, the technique of FIGS. 11A-11C, 12A-12C and 13A-13C, can also be used for forming a desired composition by combining three or more component compositions.

Figure 14A:
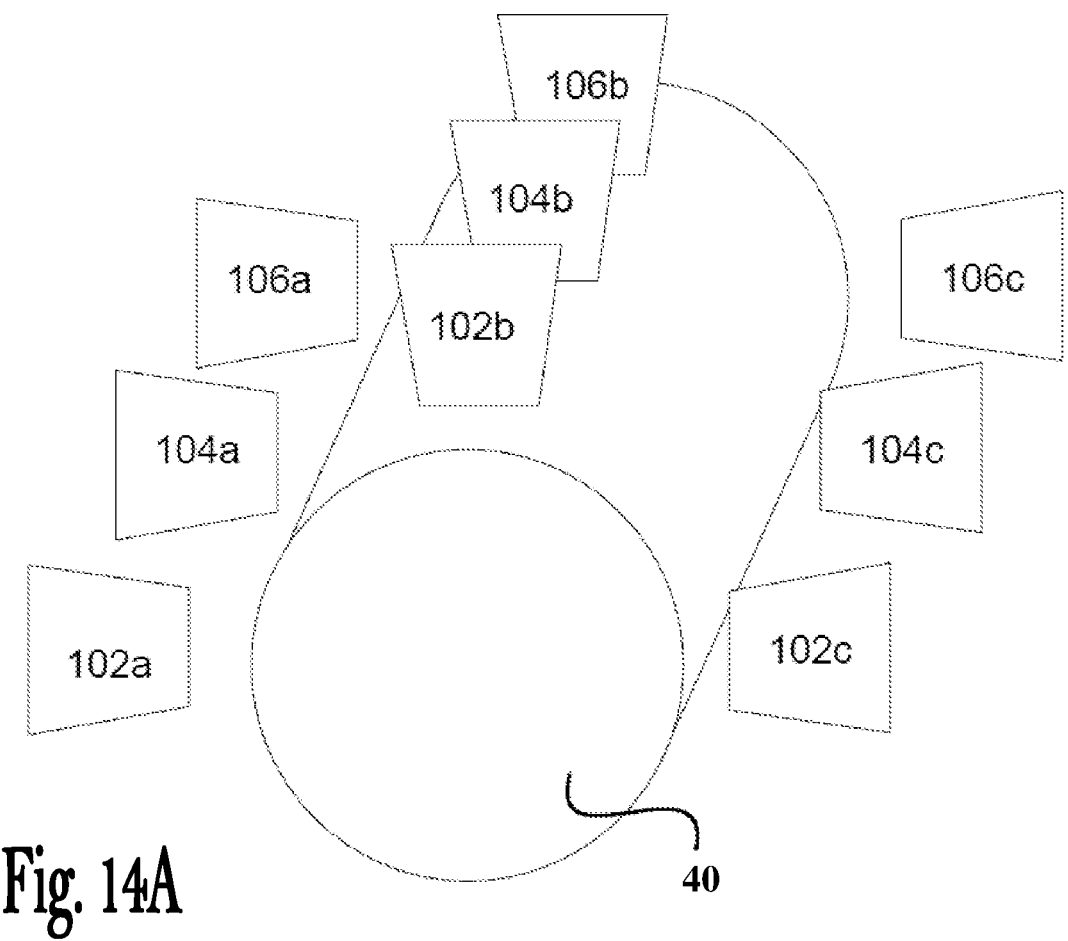
FIGS. 14A and 14B are schematic drawings exemplifying possible embodiment in which printing units belonging to different groups are located at the same position around the axis of translation, and are organized in bars/columns.
Figure 14B:
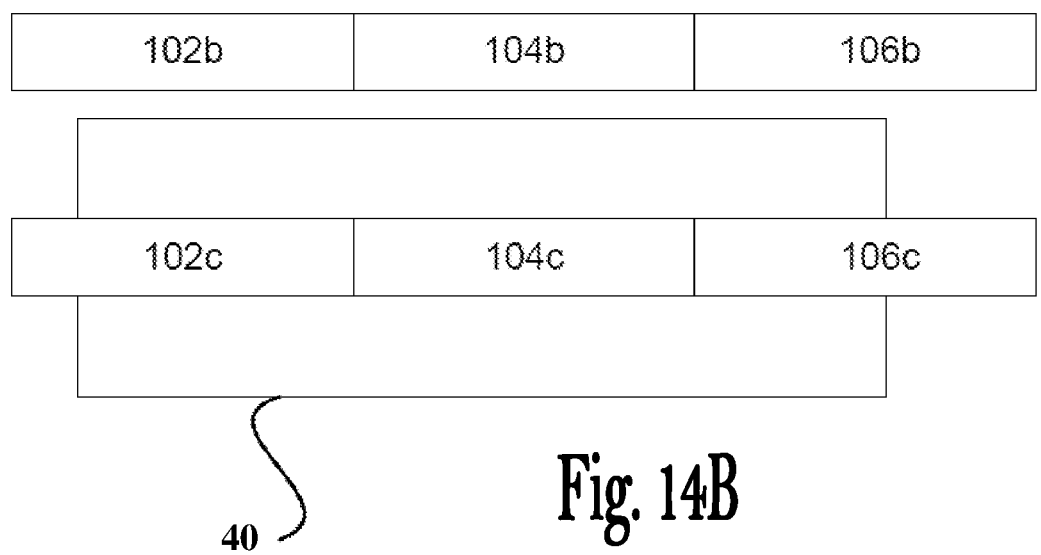

Referring now to FIGS. 14A and 14B, which are schematic drawings exemplifying possible embodiments in which print units belonging to different groups are located at the same position around the axis of translation, and are organized in bars/columns. In FIG. 14A a perspective view of the print head assembly is shown. In FIG. 14B, a side view of the print head assembly is shown.

As explained above, the print head units 102a, 102b, and 102c belong to a first group, the print head units 104a, 104b, and 104c belong to a second group, and the print head units 106a, 106b, and 106c belong to a third group. In the example of FIGS. 14A and 14B, the print head units 102a, 104a, and 106a are located at a first angular coordinate around the axis of translation. Similarly, the printing head units 102b, 104b, and 106b are located at a second angular coordinate around the axis of translation. Moreover, the printing head units 102c, 104c, and 106c are located at a third angular coordinate around the axis of translation. The printing head units 102a, 104a, and 106a form a column substantially parallel to the translation axis (as do the printing head units 102b, 104b, and 106b, and the printing head units 102c, 104c, and 106c).

In each column, the printing heads are joined to each other and form bars. The location of the print head units during printing is critical for achieving a successful printing. The print head units are to be aligned with each other along the translation axis at a high precision for high-resolution printing. Therefore, aligning the print head units with respect to each other is an important part of the printing process. The advantage of having the printing heads arranged in bars/columns lies in the fact that rather than adjusting a position of each printing head individually prior to printing, the positions of the bars/columns along the translation axis are adjusted. By adjusting the position of each bar/column, the position of a plurality of printing head units which constitute the bar/column is adjusted. Thus, once the position of the first bar/column is chosen, all the other bars/columns must simply be aligned with the first bar/column. This enables a precise and quick adjustment of the location of the printing heads prior to printing.

Though subsequent print head units of any bar of FIGS. 14A and 14B are shown to be joined to each other, this is not necessarily the case. In fact, a bar/column can include at least two subsequent print head units set so as to define an empty space therebetween.

Figure 15:
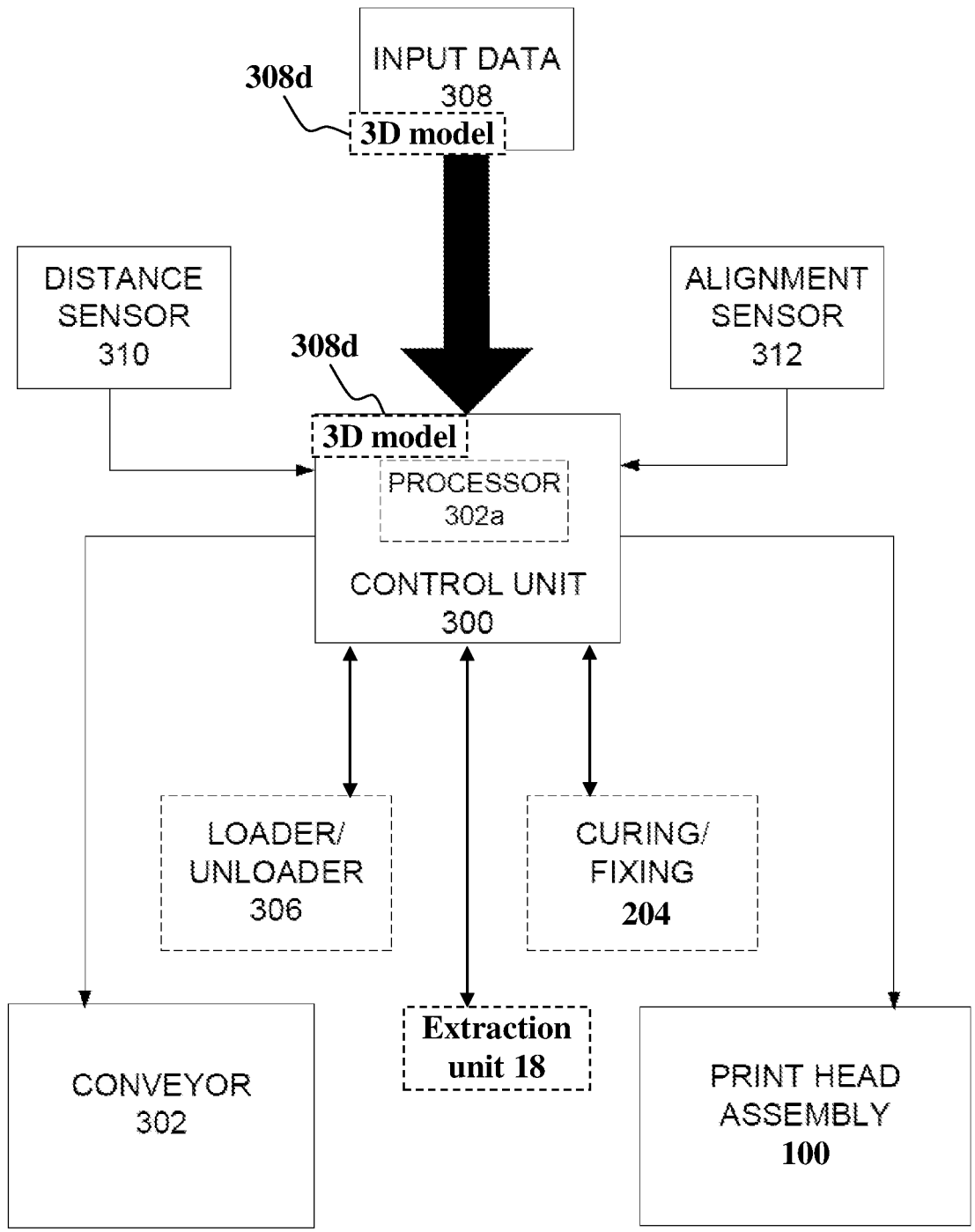
FIG. 15 is a block diagram illustrating a control unit usable according to some possible embodiments to control the conveyor system and print head assembly according to one or more kinds of input data.

Referring now to FIG. 15, which is a block diagram illustrating an embodiment of the system 200 in which a control unit 300 controls the conveyor and print head assembly according to one or more kinds of input data.

The system 200 in this non-limiting example includes a control unit 300, a conveyor system 302, and a print head assembly 100, all of which have been described hereinabove. The print head assembly 100 may, or may not, include one or more priming (204) and/or curing (202) units or stations, as described hereinabove. Optionally, the system 200 includes a loader/unloader unit 306 configured for loading the substrate(s) onto the conveyor system 302 and unloading the substrate(s) from the conveyor system 302 once the printing (and optionally curing/drying and/or priming/pretreating) is completed. The control unit 300 operates the conveyor system 302, the print head assembly 100, and the loader/unloader device 306 (if present), to create a desired sequence of operations of these elements (printing pattern), in order to yield a desired 3D object according to a predefined 3D model 308d (e.g., CAD).

Optionally, the sequence of operations and/or the 3D model 308d is transmitted to the control unit 300 from an outer source as input data 308. The outer source may be a computer, which computes a suitable sequence of operations based on properties (e.g., predefined 3D model 308d, colors, size, etc.) of the desired 3D object, which is to be printed by the system. In a variant, the control unit 300 includes a processor 302a configured for processing the 3D model 308d and determining the desired sequence of operations. The input data 308 may be data indicative of the layer patterns to be printed, which the processor 302a uses to determine the sequence of operations.

In a variant, the system 200 includes a distance sensor 310 and an alignment sensor 312. The distance sensor 310 is configured for sensing the distance between at least one print head unit and the surface of the substrate, and/or of layers printed on in. The alignment sensor 312 is configured for determining whether print head units (or bars/columns of such units, if present) are properly aligned with each other along the translation axis and/or around the translation axis.

The control unit 300 receives data from the distance sensor 310 and alignment sensor 312 in order to determine whether the print head units are in their proper positions, and determines whether or not to move them. In a variant, the control unit 300 instructs the print head units to move to their assigned positions before the printing starts (perpendicularly to the translation axis according to data from the distance sensor 310, and/or along and/or around the translation axis according to data from the alignment sensor 312). In another variant, the control unit 300 instructs the print head units to move to their assigned positions during the printing (for example, if the cross-sectional shape of the substrate, and/or of the multilayered structure printed on it, varies along the length or the cross section shape is not circular, as explained above).

The distance sensor 310 and the alignment sensor 312 may operate by emitting radiation (e.g., electromagnetic, optical, acoustic) toward a target and receiving the radiation reflected/scattered by the target. A property of the received radiation (e.g., time period after emission, phase, intensity, etc.) is analyzed in order to determine the distance between the sensor and the target.

According to a first variant, a distance sensor element is mounted on at least one of the print head units and is configured for emitting radiation to and receiving radiation from the substrate and/or from layers printed on it. According to a second variant the distance sensor is an external element which determines the position of a print head unit and of the substrate's surface, or of layers printed on it, and calculates the distance therebetween.

Similarly, in a variant, an element of the alignment sensor 312 is mounted on a print head unit and is configured for emitting radiation to and receiving radiation from another print head unit. In another variant, the alignment sensor 312 includes an external element configured for determining the position of two print head units (or bars/columns of such units) and calculating the distance therebetween.

In some embodiments of the present invention, the distance sensor and alignment sensor are not present, and a calibration process is required prior to printing. In the calibration process, the print head units of the assembly 100 are moved to their positions prior to printing, and a trial printing is performed. The pattern printed in the trial printing is analyzed either by a user or by a computer (e.g., an external computer or the control unit itself), and the positions of the print head units are adjusted accordingly, either manually or automatically. Once this calibration process is finished, the printing of one or more 3D objects can take place.

FIGS. 16 to 22 demonstrate a printing system 17 according to some possible embodiments. In general, the printing system 17 shown in FIGS. 16 to 22 is configured to maintain and handle a continuous feed of substrates 40 (also referred to herein as a stream of substrates 40) to be printed on, while maintaining minimum gap (e.g., about 2 mm to 100 mm) between adjacent substrates 40.

Figure 16:
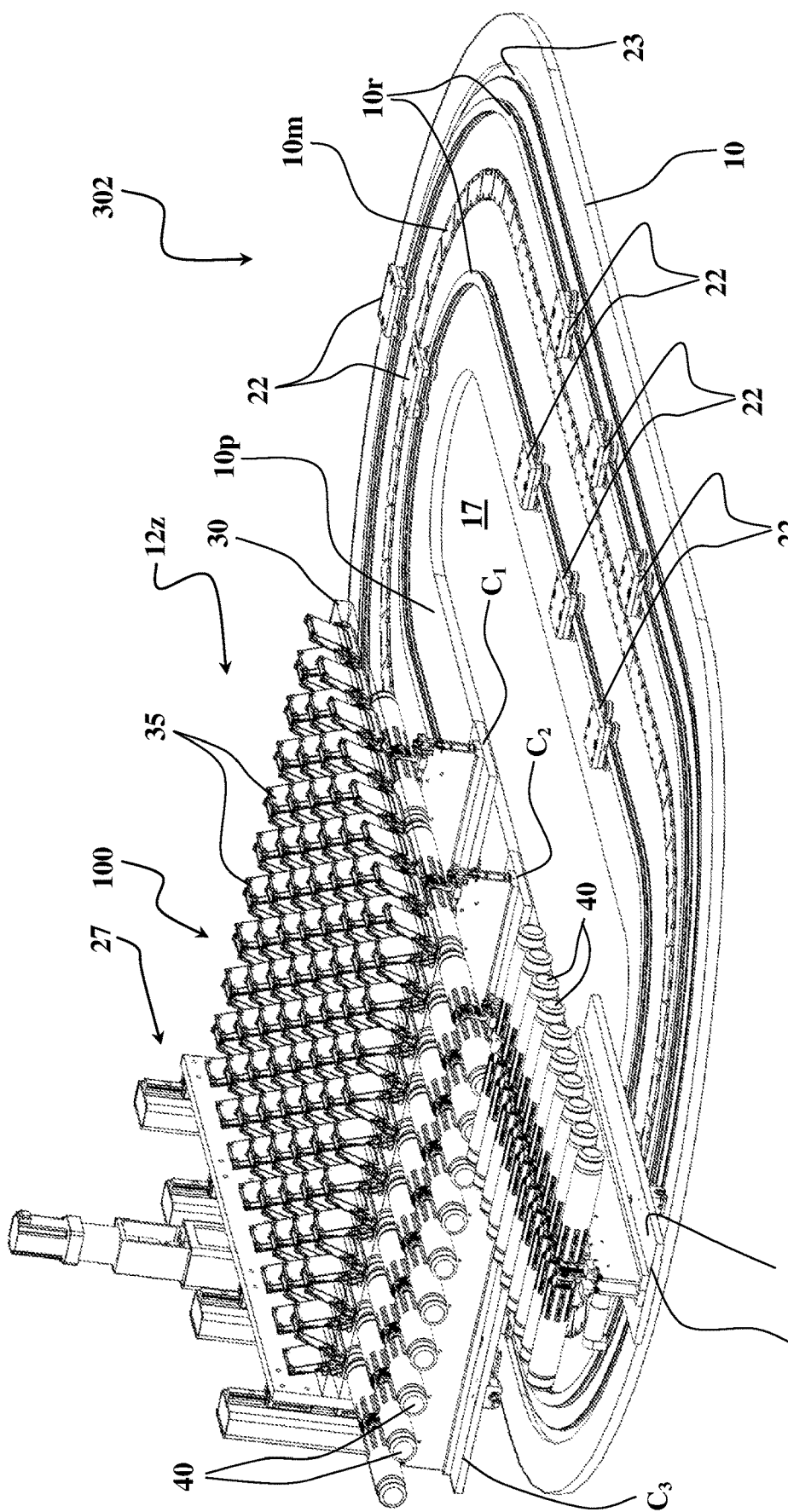
FIG. 16 schematically illustrates a conveyor system according to some possible embodiments.

With reference to FIG. 16, in this non-limiting example the printing system 17 generally comprises the closed loop lane 10 and the print head assembly 100 mounted in the printing zone 12z of the lane 10 on elevator system 27. Other parts of the printing system (e.g., priming unit, curing unit, extraction unit, etc.) are not shown for the sake of simplicity. The lane 10 is generally a circular lane; in this non-limiting example having a substantially elliptical shape. The lane 10 may be implemented by an elliptical ring shaped platform 10p comprising one or more tracks 10r each having a plurality of sliding boards 22 mounted thereon and configured for sliding movement thereover. At least two sliding boards 22, each mounted on a different track 10r, are radially aligned relative to the lane 10 to receive a detachable platform 37 and implement a carriage $C_i$ configured to hold a plurality of substrates 40 to be printed on, and advance them towards the printing zone 12z. In this non-limiting example the lane 10 comprises two tracks 10r and the sliding boards 22 slidably mounted on the tracks 22 are arranged in pairs, each sliding board of each pair of sliding boards being slidably mounted on a different track 22, such that a plurality of slidable carriages $C_1$, $C_2$, $C_3$, . . . , are constructed by attaching a detachable platform 37 to each one of said pairs of sliding boards 22.

Implementing an elliptical lane 10 may be carried out using straight rails connected to curved rails to achieve the desired continuous seamless movement on the elliptical track. Accordingly, the sliding boards 22 may be configured to enable them smooth passage over curved sections of the lane 10. Printing zones 12z of the lane 10 are preferably located at substantially straight portions of the elliptical lane 10 in order to devise printing zones permitting high accuracy, which is difficult to achieve over the curved portions of the lane 10. In some embodiments curved shape tracks have runners with a built in bearing system's tolerance to allow the rotation required by the nonlinear/curved parts of the track. Those tolerances typically exceed the total allowable error for the linear printing zone 12z. In the printing linear zone 12z, the tolerable errors allowed are in the range of few microns, due to high resolution requirements for resolution greater than 1000 dpi for high pattern qualities/resolutions. For such high resolutions require 25 micron between dots lines, which means that about ±5 micron dot accuracy is required in order for the sliding boards to pass the printing zone 12z in an accumulated printing budget error in X,Y,Z axis that will not pass the required ±5 micron tolerable dots placement position error.

The printing head assembly 100 comprises an array of printing head units 35 removably attached to a matrix board 30 and aligned thereon relative to the tracks 10r of the lane 10. The matrix board 30 is attached to the elevator system 27 which is configured to adjust the height of the printing elements of the printing heads units 35 after the printing of each layer is completed, and thereby permit successively printing a plurality layers of printing material compositions on the substrates 40 held by the carriages $C_1$, $C_2$, $C_3$, . . . , approaching the printing zone 12z.

Figure 17A:
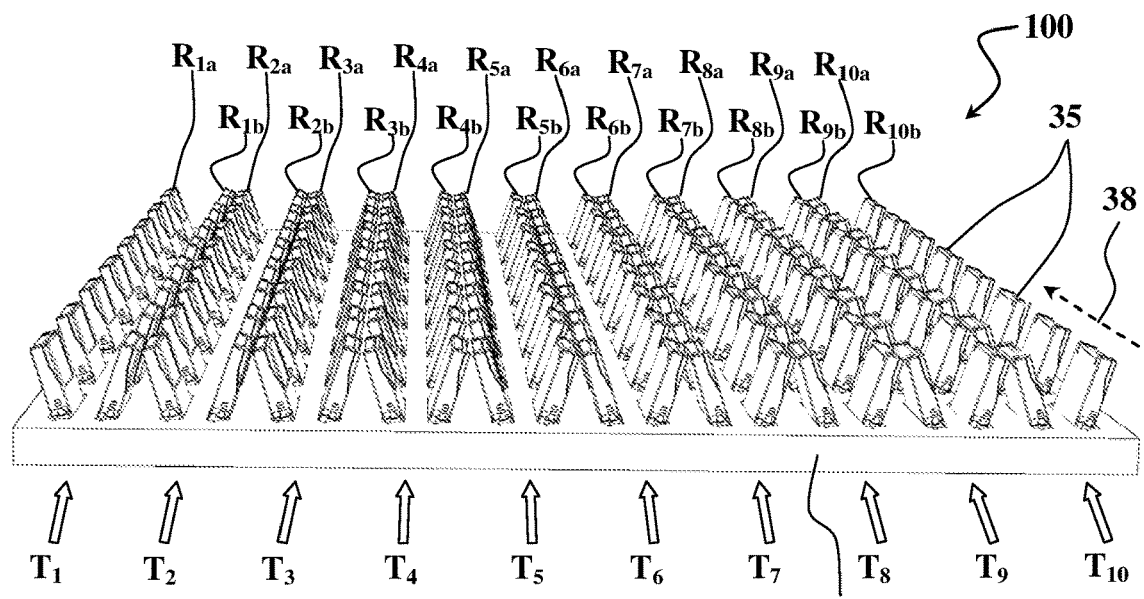
FIGS. 17A and 17B schematically illustrate arrangement of the print head assembly in the form of an array according to some possible embodiments.
Figure 17B:
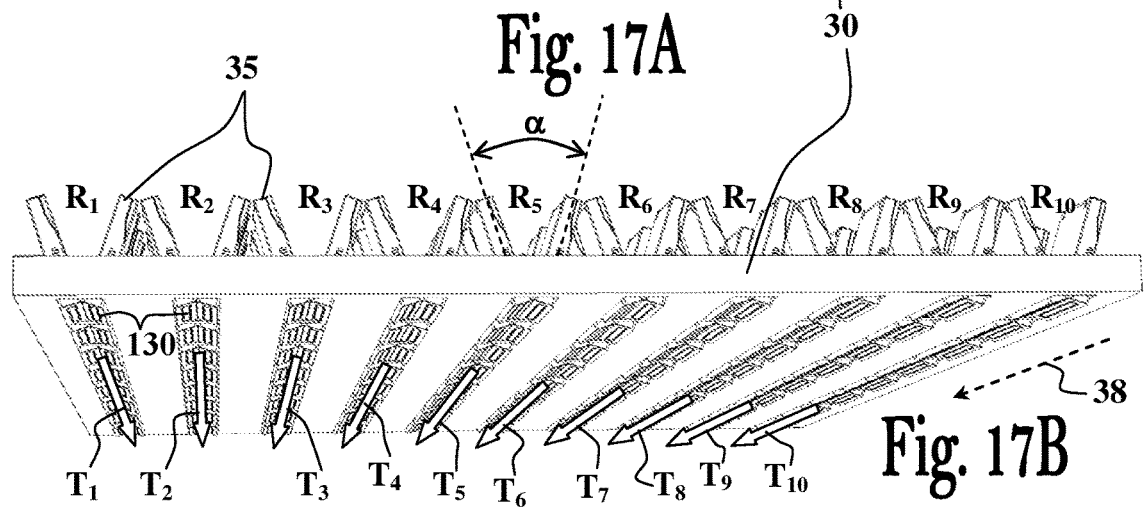

Referring now to FIGS. 17A and 17B, the array of print head units 35 of print head assembly 100 may comprise a plurality of sub-arrays $R_1$, $R_2$, $R_3$, . . . , of print head units 35, each one of said sub arrays $R_1$, $R_2$, $R_3$, . . . , configured to define a respective printing route $T_1$, $T_2$, $T_3$, . . . , in the printing zone 12z. As illustrated in 17A and 17B, the printing routes $T_1$, $T_2$, $T_3$, . . . , are defined along a printing axis 38 e.g., being substantially aligned with a the tacks 10r of the lane 10. In this way, substrates 40 moved along a printing route $T_j$ (where j≥1 is a positive integer) are passed under the printing elements 130 of the print heads of the respective sub-array $R_j$.

Each carriage $C_i$ being loaded onto the lane 10 at a loading zone (306l) with a plurality of substrates 40 is advanced through the various stages of the printing system 17 (e.g., priming 204, printing 12z, curing 202, inspection 16, and/or extraction 18), and then removed from the lane 10 at an unload zone 306u, thereby forming a continuous stream of substrates 40 entering the lane and leaving it after being printed on, without interfering the movement of the various carriages $C_i$. In this way, the closed loop lane 10 provides for a continuous feed of carriages $C_1, C_2, C_3, \ldots$, loaded with substrates 40 into the printing zone 12$z$, and independent control over the position and speed of each carriage $C_i$ (i=1, 2, 3, . . . ) maintains a minimum gap (e.g., of about 1 cm) between adjacent carriages $C_i$ in the printing zone 12$z$.

In this non-limiting example the print head assembly 100 comprises ten sub-arrays $R_j$ (j=1, 2, 3, . . . , 10) of printing head units 35, each sub-array $R_j$ comprising two columns, $R_{ja}$ and $R_{jb}$ (j=1, 2, 3, . . . , 10), of printing head units 35. The printing head units 35 in the columns $R_{ja}$ and $R_{jb}$ of each sub-array $R_j$ may be slanted relative to the matrix board 30, such that printing elements 130 of the printing head units of one column $R_{ja}$ are located adjacent the printing elements 130 of the printing head units of other column of the sub-array column $R_{jb}$. For example, and without being limiting, the angle α between two adjacent print head units $R_{ja}$ and $R_{jb}$ in a sub-array $R_j$ may generally be about 0° to 180°, depending on the number of print head units used. The elevator system 27 is configured to adjust the elevation of the print head units 35 according the layer being printed on the substrates 40 e.g., its diameter. For example, in some possible embodiments the printing head assembly 100 is configured such that for cylindrical objects having a diameter of about 50 mm the printing heads 35 are substantially perpendicular to a tangent at the points on the surface of the object under the printing elements 130 of said printing heads 35. For cylindrical objects having a diameter of about 25 mm the angles between the printing heads remains in about 73 degrees and the tangent is not preserved, which in effect results in a small gap between the printing elements 130 of the print heads 35 and the surface of the objects located beneath them. The formation of this gap may be compensated by careful scheduling the time of each discharge of ink through the printing elements 130 according the angular and/or linear velocity of the object and the size of gap formed between the printing elements 130 and the surface of the objects 101.

Angular distribution of the print heads is advantageous since it shortens the printing route (e.g., by about 50%), by densing the number of nozzles per area, and as a result shortening the printing zone 12$z$ (that is very accurate), thereby leading to a total track length that is substantially shortened.

Figure 18:
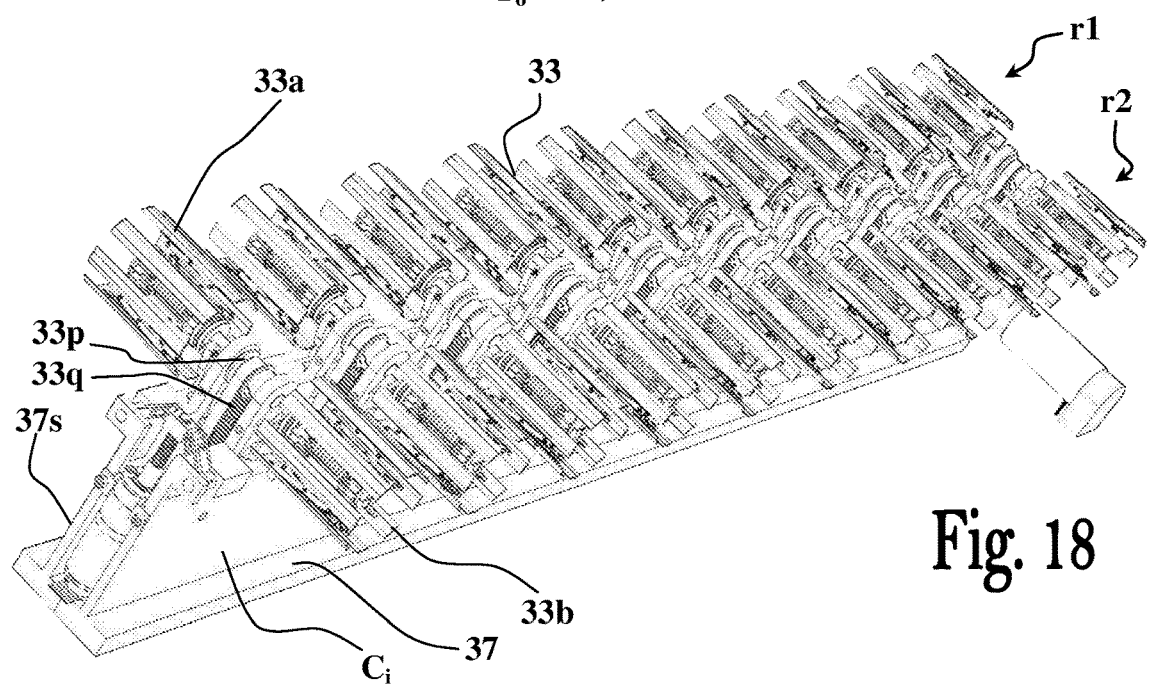
FIG. 18 schematically illustrates a carriage and an arrangement of substrate holders mounted thereon, configured to hold substrates to be printed on and translate and rotate them over the conveyor system.

FIG. 18 illustrates a structure of a carriage $C_1$ according to some possible embodiments. In this non-limiting example the carriage $C_i$ comprises an arrangement of rotatable substrates holders 33 mounted spaced apart along a length of the carriage $C_i$. More particularly, the rotatable substrate holders 33 are arranged to form two aligned rows, r1 and r2, of rotatable holders 33, wherein each pair of adjacent holders 33$a$ and 33$b$ belonging to different rows are mechanically coupled to a common pulley 33$p$ rotatably mounted in a support member 37$s$ vertically attached along a length of the detachable platform 37. The holders 33$a$ and 33$b$ of each pair adjacent substrate holders 33 belonging to different rows r1 and r2 are mechanically coupled to a single rotatable shaft, which is rotated by a belt 33$q$.

In some embodiments the same belt 33$q$ is used to simultaneously rotate all of the pulleys 33$p$ of the rotatable substrate holders arrangement, such that all the holders 33 can be controllably rotated simultaneously at the same speed, or same positions, and direction whenever the carriage $C_i$ enters any of the priming, printing, curing, and/or extracting, stages of the printing system 17. A gap between pairs of adjacent substrate holders 33$a$ and 33$b$ belonging to the different rows r1 and r2 of holders may be set to a minimal desirable value e.g., of about 30 mm. Considerable efficiency may be gained by properly maintaining a small gap between carriages (e.g., about 1 cm) adjacently located on the lane 10, and setting the gap between pairs of substrate holders 33$a$ and 33$b$ belonging to the different rows r1 and r2 (e.g., about 30 mm, resulting in efficiency that may be greater than 85%).

In order to handle the multiple substrate holders 33 of each carriage $C_i$ and obtain high printing throughput, in some embodiments all substrates are rotated with a speed accuracy tolerance smaller than 0.5% employing a single driving unit (not shown). Accordingly, each carriage $C_i$ may be equipped with a single rotation driver and motor (not shown), where the motor shaft drives all of the substrate holders 33 using the same belt 33$q$. In some embodiments the speed of the rotation of the substrate holders 33 is monitored using a single rotary encoder (not shown) configured to monitor the rotations of one of the pulleys 33$p$. In this non-limiting example, each row (r1 or r2) of substrate holders 33 includes ten pulleys 33$p$, each pulley configured to rotate two adjacent substrate holders 33$a$ and 33$b$ each belonging to a different row r1 and r2, such that the belt 33$q$ concurrently rotates the ten pulleys, and correspondingly all twenty substrate holders 33 of the carriage $C_i$ are thus simultaneously rotated at the same speed and direction.

Figure 19:
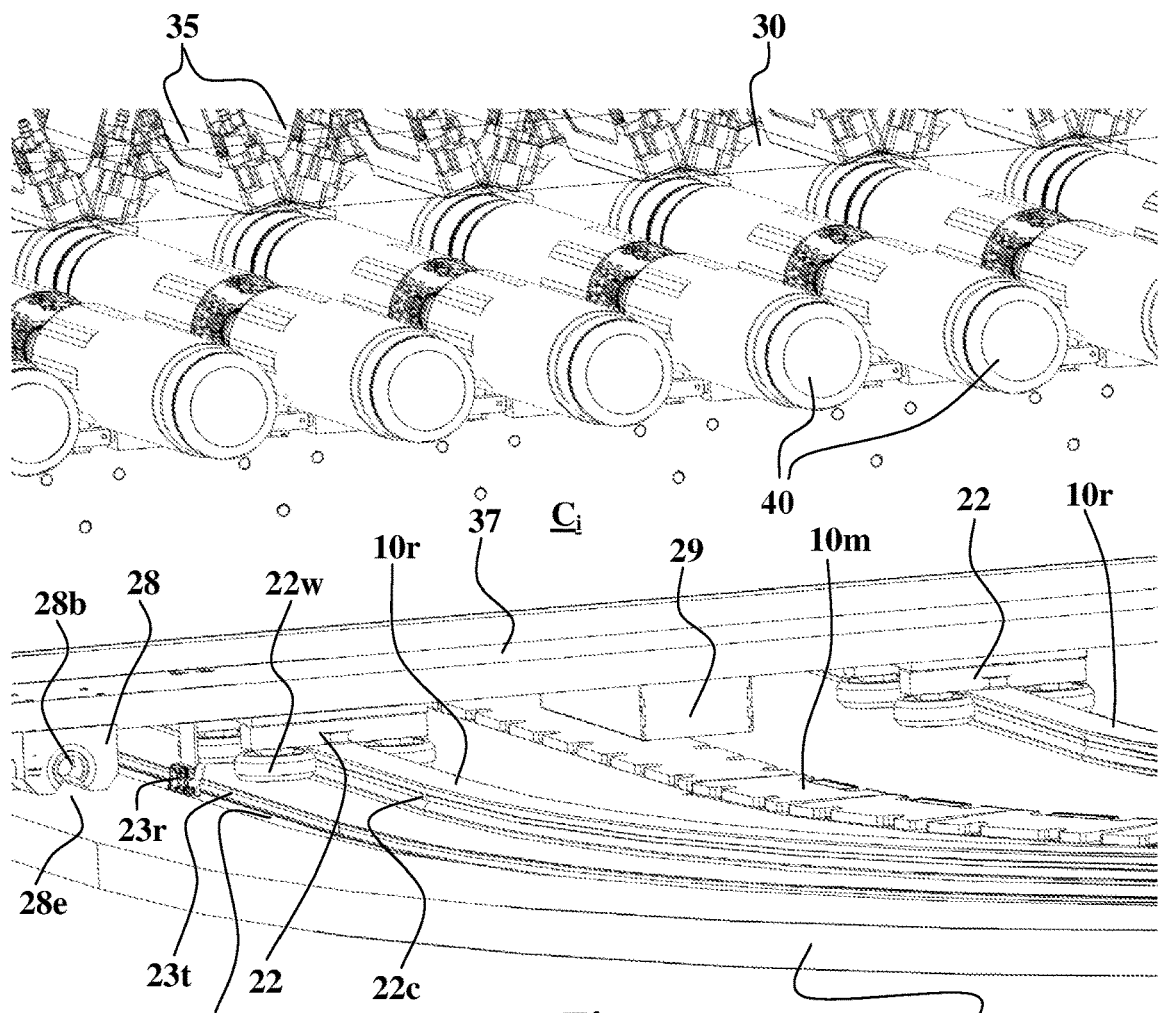
FIG. 19 schematically illustrates a carriage loaded with a plurality of substrates to be printed on entering a printing zone of the system.

FIG. 19 shows the coupling of the carriage $C_i$ to the lane 10 according to some possible embodiments. Each sliding board 22 in this non-limiting example comprises four horizontal wheels 22$w$, where two pairs of wheels 22$w$ are mounted on each side of the sliding board 22 and each pair of wheels 22$w$ being pressed into side channels 22$c$ formed along the sides of the tracks 10$r$. The lane 10 may further include a plurality of magnet elements 10$m$ mounted therealong forming a magnet track (secondary motor element) for a linear motor installed on the carriages $C_i$. A linear motor coil unit 29 (forcer/primary motor element) mounted on the bottom side of each detachable platform 37 and receiving electric power from a power source of the carriage (e.g., batteries, inductive charging, and/or flexible cable) is used for mobilizing the carriage over the lane. An encoder unit 23$r$ attached to the bottom side of the carriage $C_i$ is used to provide real time carriage positioning signal to the controller unit of the carriage. Each carriage $C_i$ thus comprises at least one linear motor coil and at least one encoder so as to allow the control unit 300 to perform corrections to the positioning of the carriage $C_i$. In this way linear motor actuation of the carriages $C_i$ may be performed while achieving high accuracy of position of carriage movement, over the linear and curved areas of the lane 10.

For example, and without being limiting, the magnetic track 10$m$ used for the linear motors may be organized in straight lines over the straight portions of the lane 10, and with a small angular gap in the curved portion of the lane 10. In some embodiments this small angular gap is supported by special firmware algorithm provided in the motor driver to provide accurate carriage movements. The lane may further include an encoder channel 23 comprising a readable encoded scale 23$t$ on a lateral side of the channel 23. The encoder scale 23$t$ is preferably placed around the entire elliptical lane 10, and the encoder unit 23$r$ attached to the bottom side of each carriage $C_i$ is introduced into the encoder channel 23 to allow real time monitoring of the carriage movement along the lane 10.

High resolution encoding allows closing of position loops in accuracy of about 1 micron (micrometer). For example, and without being limiting, the improved accuracy may be used to provide carriage location accuracy of about 5 microns, in-position time values smaller that 50 msec in the printing zone $12z$, and speed accuracy smaller than 0.5%.

Figure 20:
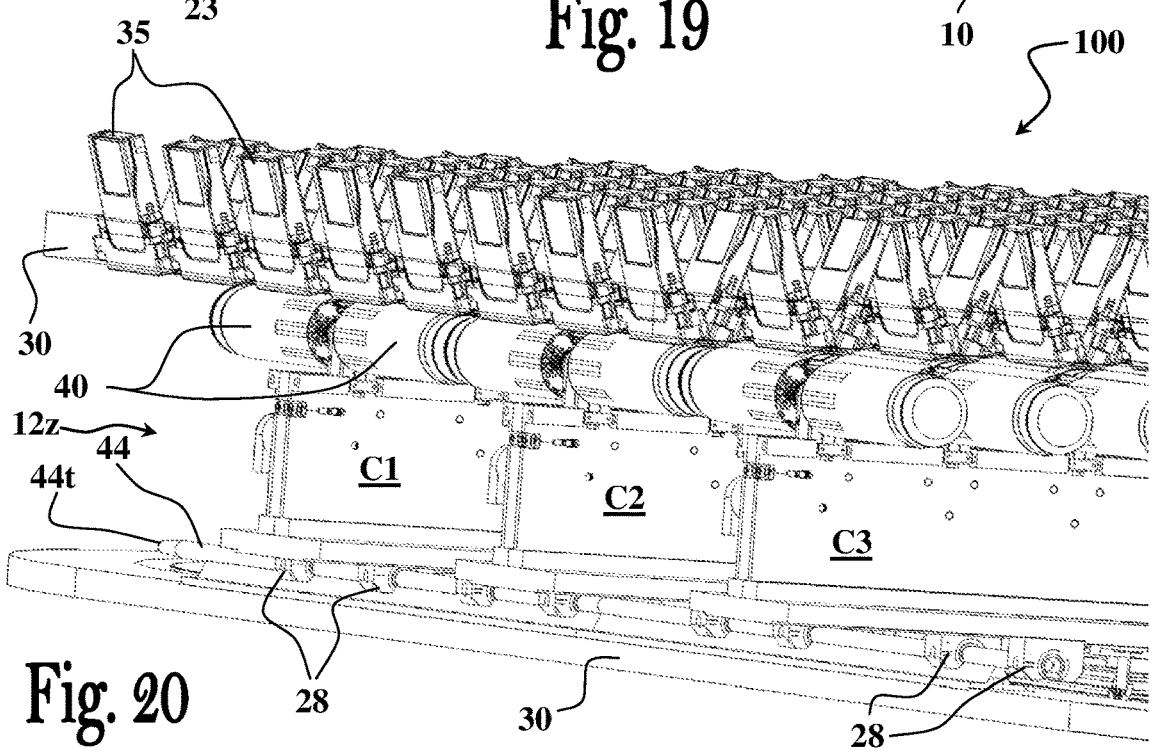
FIG. 20 schematically illustrates simultaneous printing on a plurality of substrates attached to three different carriages traversing the printing zone.

FIG. 20 schematically illustrates simultaneous printing by the print head assembly 100 on surfaces of a plurality of substrates 40 carried by three different carriages, $C_1$, $C_2$ and $C_3$. In order to enabler high printing resolutions, the movement of the carriages $C_i$ in the printing zone $12z$ should be carried out with very high accuracy. For this purpose, in some embodiments, a highly accurate (of about 25 micron per meter) linear rod 44 is installed along the printing zone $12z$, and each carriage $C_i$ is equipped with at least two open bearing runners 28 which become engaged with the linear rod 44 upon entering the printing zone $12z$. In order to facilitate receipt of the linear rod 44 inside the bearing runners 28, in some embodiments the linear rod 44 is equipped with a tapering end section $44t$ configured for smooth insertion of the rod 44 into the opening $28b$ (shown in FIG. 18) of the bearing runners 44. A combination of individual carriage control (driver and encoder on each carriage) allows recognition of the exact position of the tapering entry section $44t$ for allowing the carriage $C_i$ to perform slow and smooth sliding of the bearing 28 onto the rod 44, thereby preventing direct damage to the bearings 28 and to the rod 44. The engagement of the carriage to the linear rod 44 is supported by a special firmware in the controller of the carriage and/or on the motor driver.

The substrate holders 33 may be implemented in various different ways suitable to allow firm grip over the substrates 40 and maintaining them substantially parallel to the axis of translation 110, while permitting the substrate holders 33 to rotate the held the substrates 40 during the 3D printing process. For example, and without being limiting, the substrate holders 33 may be implemented using a rotatable shaft having an adjustable clamp mechanism (as used for holding drill bits in power tools). Alternatively, the rotatable shaft may comprise a socket adapted to receive one end section of the substrate and one or more pressure applying openings capable of holding the substrate end section thereinside by application of pressure (e.g., vacuum). In a yet alternative possible implementation the socket provided in the rotatable shaft may comprise a an inner snapping ring or tongue configured to snap fit into a respective circumferential groove provided on the outer surface of the end section of the substrate. Of course any other suitable attachment mechanism may be equally used.

Figure 21A:
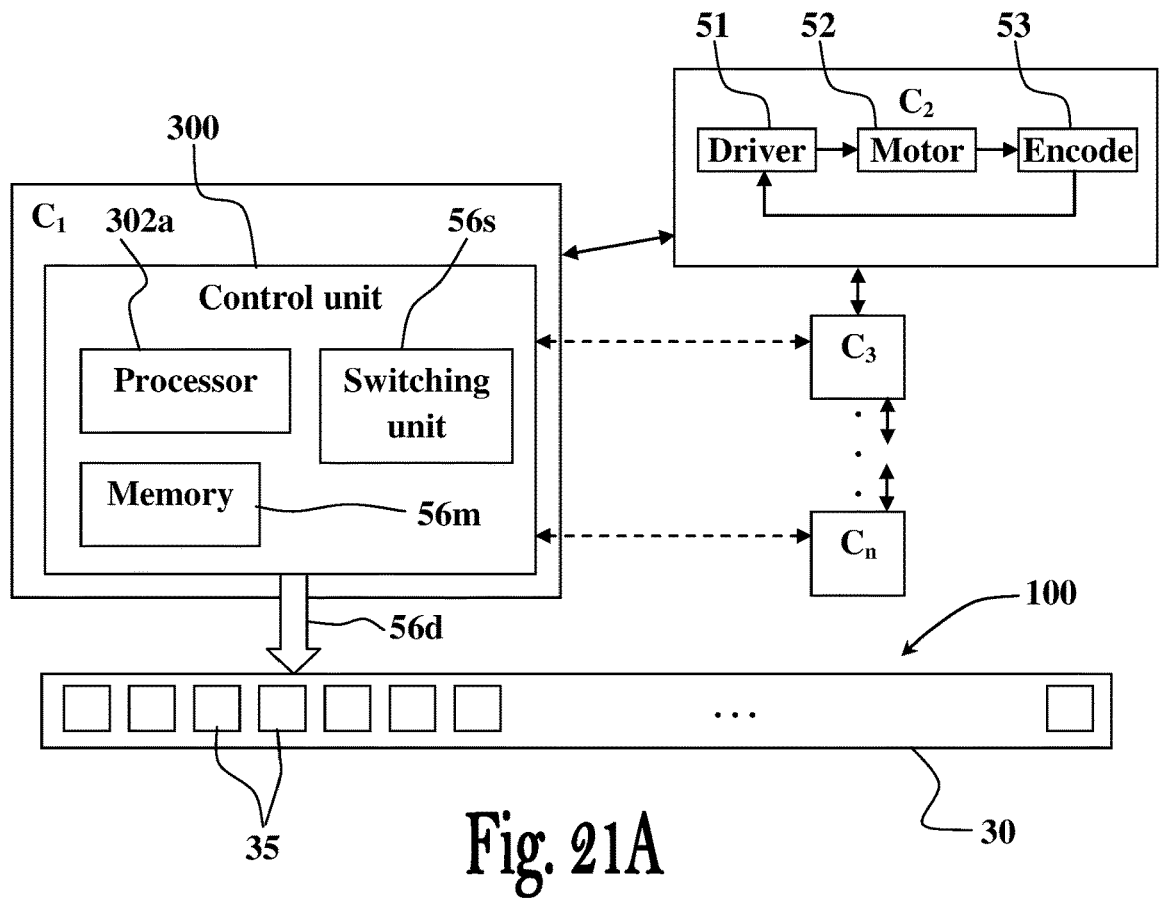
FIGS. 21A to 21C schematically illustrate possible control schemes usable in some possible embodiments.
Figure 21B:
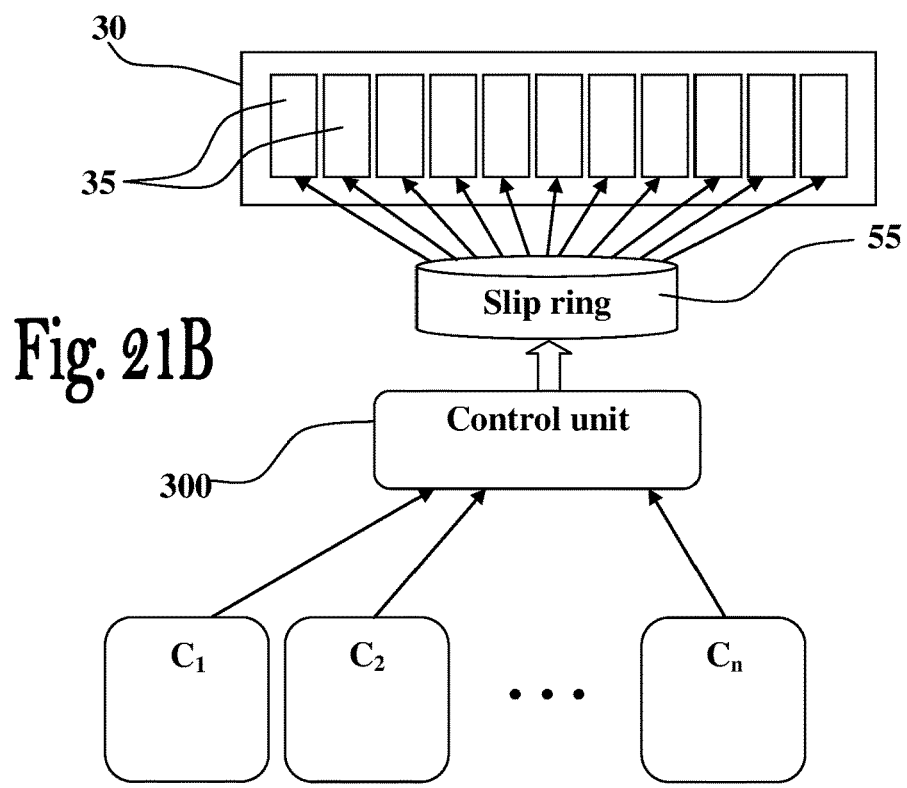
Figure 21C:
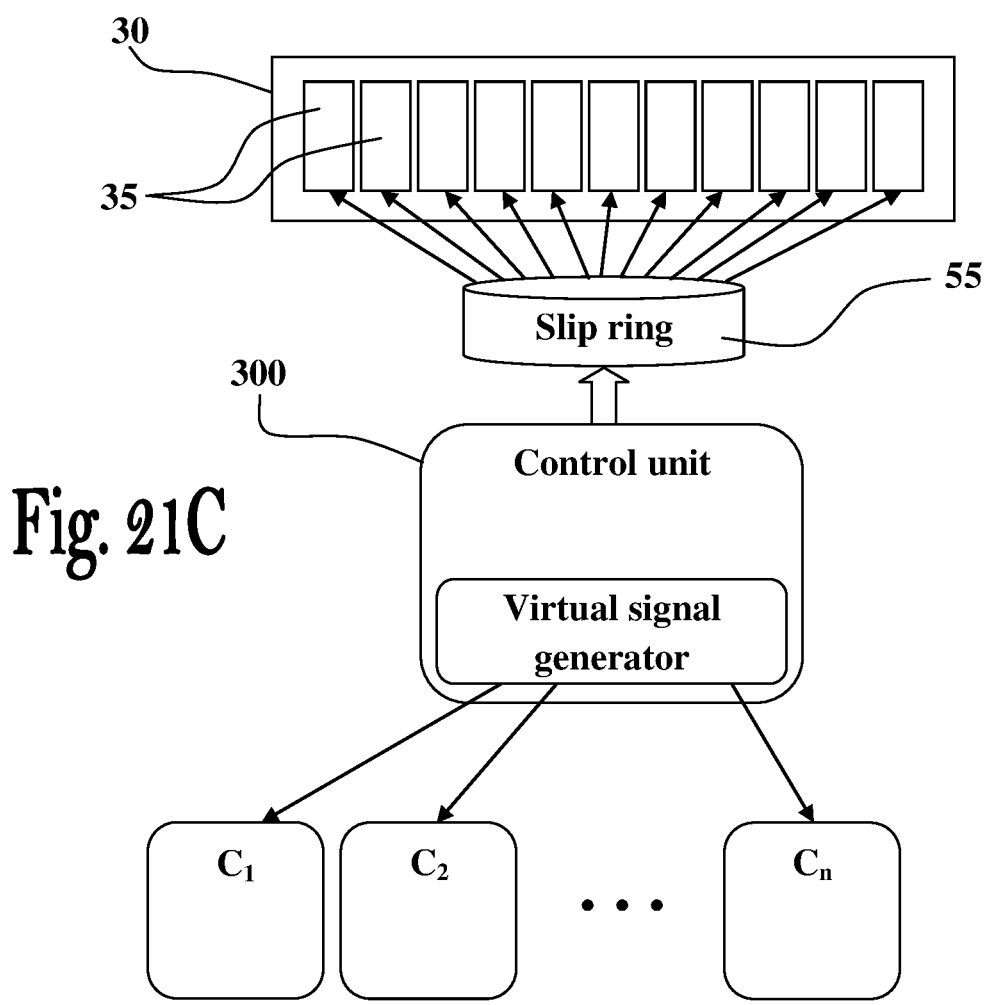

FIGS. 21A to 21C demonstrate possible control schemes that can be used in the printing system 17. One of the tasks of the control unit 300 is to synchronize print heads data jetting signals from each substrate holder 33 under the print heads assembly 100 (exemplified in FIG. 21B) or adjust the speed of the carriage to align it with strict control done by the controller/driver on each carriage $C_i$, so as to adjust a virtual signal for all print heads units and carriages movement or/and rotation (demonstrated in FIG. 21C). For this purpose the control unit 300 is configured to synchronize the ink jetting data supplied to the print heads according to the position of each carriage $C_i$ in the printing zone $12z$, while simultaneously multiple carriages $C_i$ are being advanced inside the printing zone and their substrate holders 33 are being rotated under its printing head arrays. FIG. 21A shows a general control scheme usable in the printing system 17, wherein the control unit 300 is configured to communicate with each one of the carriages $C_i$ to receive its carriage position data and substrate holders 33 angular positions (orientation, i.e., using rotation encoder) data, and generate the ink jetting data $56d$ supplied to the print head assembly 100 to operate each one of the printing heads 35 having substrates 40 located under its nozzles.

FIG. 21A demonstrates possible approaches for communication between the control unit 300 and the carriages $C_i$. One possible approach is to establish serial connection between the plurality of carriages $C_i$ moving on lane 10 e.g., using a flexible cable (not shown) to electrically (and pneumatically) connect each pair of consecutive carriages $C_i$ on the lane 10. In this approach the carriage/substrate, the electrical supply, position data, and other motion and control data are serially transferred along the serial connection of the carriages $C_i$. The data communication over such serial communication connectivity may be performed, for example, using any suitable serial communication protocol (e.g., Ethercat, Etheret and suchlike). In possible embodiments, electrical connection between the carriage $C_i$ and the control unit 300 may be established using an electrical slip ring and/or wirelessly (e.g., Bluetooth, IR, RF, and the like for the data communication and/or a wireless power supply scheme such as inductive charging).

An alternative approach may be to establish direct connection, also called star connection (illustrated by broken arrowed lines) between the control unit 300 and power supply (not shown) units and the carriages $C_i$ on the lane 10. Such direct connection with the carriages $C_i$ may be established using an electrical slip ring and/or wirelessly (e.g., Bluetooth, IR, RF, and the like for the data communication and/or a wireless power supply scheme such as inductive charging).

A switching unit $56s$ may be use in the control unit 300 for carrying out the printing signals switching (index and encoder signals and other signals) of each carriage $C_i$ to the respective print head units 35 above the carriages $C_i$ traversing the printing zone $12z$. The switching unit $56s$ may be configured to receive all printing signals from all the carriages $C_i$ and switch each one of the received printing signals based on the position of carriages $C_i$ with respect to the relevant print heads 35.

FIG. 21A also demonstrates a possible implementation wherein the control unit 300 is placed on one of the carriages $C_i$; in this non-limiting example on the first carriage $C_1$. Each carriage $C_i$ may also include a controller (not shown) configured to control the speed of the carriage over the lane 10, the rotation of the substrate holders 33, the data communication with the control unit 300, and performing other tasks and functionalities of the carriage as required during the different stations (e.g., priming, curing, inspection, loading, object extraction etc.) along the lane 10. FIG. 21A further shows an exemplary control scheme usable in each carriage $C_i$ for controlling the speed of the carriage. In this control scheme a driver unit 51 is used to operate an electric motor 52 according to speed control data received from the control unit 300, and an encoder 53 coupled to the motor, and/or to rotating element associated with it, is used to acquire data indicative of the current speed/position of the carriage $C_i$ and feeding it back to the driver unit, to thereby establish a closed loop local control.

The control unit 300, configured to implement independent control of the carriage $C_i$, typically requires monitoring and managing carriage movement and substrate holders 33 rotation speeds, and optionally also full stop thereof, at different stages of the printing process carried out over the elliptic lane 10 (e.g., plasma treatment, UV, inspection, printing, loading/unloading, extraction). For example, and without being limiting, the control unit 300 may be configured to perform loading/unloading of a plurality of substrates 40 on rotatable substrates holders 33 of one carriage, simultaneously advance another carriage in high speed through the printing zone 12z while printing desired patterns over outer surfaces of a plurality of substrates 40 carried by the carriage, and concurrently advance and slowly rotate substrate holders of yet another carriage under a UV curing process. The control unit 300 is further configured to guarantee high precision of the carriage movement and substrate holders rotation of the carriages $C_i$ traversing the printing zone 12z e.g., to maintain advance accuracy of about 5 microns for high print resolution of about 1200 dpi In some possible embodiments each carriages $C_i$ is equipped with two driver units 51, two motors 52 (i.e., a linear carriage movement motor and a substrate holder rotative motor), and one or more high resolution position encoders 53 (i.e., a linear encoder and a rotative encoder) which are configured to operate as an independent real time motion system. Each one of the drivers is configured to perform the linear or rotary axis movement, where the carriage linear advance and substrate holders rotation per carriage (or per substrate holder in other models) according to a general control scheme that is optimized to achieve high precision in real time. Accordingly, each carriage can effect both linear and rotatary motion of the substrates.

FIGS. 21B and 21C are block diagrams schematically illustrating possible control schemes usable for to achieve synchronization between the carriages $C_i$ and the print head units 35 of the print head assembly 100. FIG. 21B demonstrates a multiple signal synchronization approach, wherein position (linear of the carriage and/or angular of the substrate holders) data from each carriage $C_i$ is received and processed by the control unit 300. The control unit 300 process position data, accurately determines which carriage $C_i$ is located under each print head unit 35, and accordingly generates control signals for activation of the print head units 35. The control signals are delivered to the print head assembly 100 through an electrical slip ring mechanism 55 (or any other suitable rotative cable guide). In this configuration each carriage $C_i$ is independently controlled with respect to its speed and position on the lane 10.

FIG. 21B demonstrates another approach employing a single virtual synchronization signal that synchronizes substrate holder rotations, speed and position, of all carriage $C_i$ with the print head units 35 of the print head assembly 100. In this embodiment the control unit 300 is configured to provide a virtual pulse to the carriages $C_i$ that receives the virtual pulse and are then accordingly aligned. Once aligned with the virtual pulse, synchronization between the rotation requested and required is achieved. Under such synchronization the controller may use the virtual signal to initiate the print heads units ejection and printing.

In a possible embodiment the electrical slip ring mechanism 55 is installed at the middle of the elliptic lane 10, and the carriages $C_i$ are electrically linked to the print head assembly via flexible cables (that are in between the carriages) electrically coupled to the electrical slip ring mechanism 55. The electrical slip ring mechanism 55 may be configured to transfer the signals from the carriages $C_i$ to the switching unit 56s of the control unit 300, which generates control signals to operate the printing heads 35 for printing on the substrates held by the respective carriages $C_i$ traversing the printing zone 12z. In other possible scenarios the carriages $C_i$ in the printing zone 12z are synchronized to one virtual pulse to create a synchronized fire pulse to the print head units 35 and thereby allow single print head printing on a plurality of different tubes carried by different carriages $C_i$ at the same time.

With this design the printing system is capable of maintaining high efficiency of printing heads utilization in cases wherein the length of the substrates 40 is greater than the length of a print head, and maintain high printing efficiency in cases wherein a single print head is printing simultaneously on two different substrates 40. The print heads 35 may be organized to form a 3D printing tunnel shape.

Printing systems implementation based on the techniques described herein may be designed to reach high throughputs ranging, for example, and without being limiting, between 5,000 to 50,000 3D objects per hour depending on the dimensions. In some embodiments the ability to simultaneously print a plurality of 3D objects traversing the printing zone by the print head assembly may yield utilization of over 80% (efficiency) of the printing heads.

Functions of the printing system described hereinabove may be controlled through instructions executed by a computer-based control system. A control system suitable for use with embodiments described hereinabove may include, for example, one or more processors 302a connected to a communication bus, one or more volatile memories 56m (e.g., random access memory—RAM) or non-volatile memories (e.g., Flash memory). A secondary memory (e.g., a hard disk drive, a removable storage drive, and/or removable memory chip such as an EPROM, PROM or Flash memory) may be used for storing data, computer programs or other instructions, to be loaded into the computer system.

For example, computer programs (e.g., computer control logic) may be loaded from the secondary memory into a main memory for execution by one or more processors of the control system. Alternatively or additionally, computer programs may be received via a communication interface. Such computer programs, when executed, enable the computer system to perform certain features of the present invention as discussed herein. In particular, the computer programs, when executed, enable a control processor to perform and/or cause the performance of features of the present invention. Accordingly, such computer programs may implement controllers of the computer system.

As described hereinabove and shown in the associated Figs., the present invention provides a printing system for simultaneous printing a plurality of 3D objects in a successive stream via a printing zone, and related methods. While particular embodiments of the invention have been described, it will be understood, however, that the invention is not limited thereto, since modifications may be made by those skilled in the art, particularly in light of the foregoing teachings. As will be appreciated by the skilled person, the invention can be carried out in a great variety of ways, employing more than one technique from those described above, all without exceeding the scope of the invention.

The invention claimed is:

1. A system for printing three-dimensional objects, the system comprising:
    a support system operable for supporting one or more substantially cylindrically-shaped substrates and rotating each of the one or more substantially cylindrically-shaped substrates about a translation axis thereof while within at least one printing route; and
    at least one print head assembly spaced apart from the translation axis, the print head assembly comprising at least one array of print head units configured to define the at least one printing route along said translation axis, the print head units being arranged in a spaced-apart relationship along the at least one printing route defined along said translation axis and being operable for movement with respect to the translation axis, the movement including at least one of a movement along radial axes and movement along one or more axes substantially perpendicular to the translation axis, to allow layer-by-layer additive printing of three-dimensional objects over the one or more substantially cylindrically-shaped substrates while being rotated about their translation axes.

2. The system of claim 1 wherein at least one print head unit in the at least one array of print head units is operable for printing a material composition operable for fusing to at least one of surfaces of the substrates elements or surfaces of previously printed layers.

3. The system of claim 1 wherein at least one print head unit in the at least one array of print head units is operable for printing a material composition adapted to provide removable contact with at least one of the surfaces of the substrate elements or surfaces of previously printed layers.

4. The system of claim 1 comprising a closed loop lane for moving the one or more substantially cylindrically-shaped substrates therealong.

5. The system of claim 1, further comprising a support platform for supporting at least one stream of the substantially cylindrically-shaped substrates, for moving the substantially cylindrically-shaped substrates along a general conveying direction passing through the at least one printing route, and for rotating each of the substantially cylindrically-shaped substrates about its translation axis while being moved along the printing route.

6. The system of claim 1, wherein the print head assembly includes: at least one additional array of the print head units, such that the print head units of the at least one additional print head array are arranged along at least one additional printing route.

7. The system of claim 5, wherein:
the print head assembly includes at least one additional array of the print head units, such that the print head units of the at least one additional print head array are arranged along at least one additional printing route; and
the support platform is configured to support at least one additional stream of the substantially cylindrically-shaped substrates and to move them on the support system along the general conveying direction passing through the at least one additional printing route.

8. The system of claim 7, wherein the print head units of the at least two arrays of the print head units are generally arranged in a common plane such that each array of the print head units define a respective printing route, the support system and the support platform being configured for simultaneously moving the at least two streams of substantially cylindrically-shaped substrates along the at least two printing routes covered by the respective at least two arrays of the print head units.

9. The system of claim 1, further comprising a control unit configured to operate: the support system to carry out the translational movement along the general conveying direction and the rotational movement about the translation axis of each substantially cylindrically-shaped substrate; the movement of the print head units along radial axes, or one or more axes substantially perpendicular, to the translation axis; and at least some of the print head units to concurrently print on at least one of surfaces of the substantially perpendicular substrates and surfaces of previously printed layers.

10. The system of claim 9, wherein the control unit is configured to operate the support system to carry out the translational movement along the general conveying direction in a step-wise fashion, and to operate the support platform to carry out the rotational movement at least during a time interval in which translational movement does not occur, and to operate at least some of the print head units to carry out the printing during the time interval in which translational movement does not occur.

11. The system of claim 9, wherein the control unit is configured for operating the support system and the support platform to carry out the translational and rotational movements simultaneously while operating at least some of the print head units to effect printing, such that substantially continuous printing is performed along spiral paths on surfaces of the substrate elements, or on surfaces of previously printed layers.

12. The system of claim 9, wherein the control unit is configured for operating the support system and the support platform to carry out the translational and rotational movements substantially simultaneously while operating at least some of the print head units to effect printing, such that substantially continuous printing is performed along spiral paths on surfaces of the substantially cylindrically-shaped substrates, or on surfaces of previously printed layers, and to operate the support system and at least some of the print head units, so as to effect simultaneous printing on surfaces of at least one of the substantially cylindrically-shaped substrates, or on surfaces of previously printed layers thereof, by at least two print head units belonging to the same array of print head units.

13. The system of claim 9, wherein the control unit is configured to selectively shift one or more of the print head units between an inoperative passive state and an operative active state thereof.

14. The system of claim 9, wherein the control unit is configured to generate a signal for synchronizing operation of the print head units according to angular and linear position of the substantially cylindrically-shaped substrates carried by the support platform along the printing route.

15. The system of claim 1, further comprising at least one curing unit configured for curing a material composition ejected by the print head assembly on the surfaces of the substantially cylindrically-shaped substrates, or of previously printed layers thereof.

16. The system of claim 1, further comprising at least one priming unit configured for priming at least one location of the substantially cylindrically-shaped substrates.

17. The system of claim 1, wherein successive printing elements of at least one of the print head units are configured for ejecting respective compositions, such that a combination of the respective compositions forms a desired composition.

18. The system of claim 17, wherein the combination of the respective compositions comprises at least one of a mixing between the respective compositions and a chemical reaction between the respective compositions.

* * * * *